US012033566B2

(12) United States Patent
Yang et al.

(10) Patent No.: US 12,033,566 B2
(45) Date of Patent: Jul. 9, 2024

(54) PIXEL, DRIVER AND DISPLAY DEVICE HAVING THE SAME

(71) Applicant: Samsung Display Co., Ltd., Yongin-si (KR)

(72) Inventors: Jin-Wook Yang, Yongin-si (KR); Yu-Chol Kim, Yongin-si (KR); Sehyuk Park, Yongin-si (KR); Donggyu Lee, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/127,341

(22) Filed: Mar. 28, 2023

(65) Prior Publication Data

US 2024/0005847 A1 Jan. 4, 2024

(30) Foreign Application Priority Data

Jul. 4, 2022 (KR) ........................ 10-2022-0081813

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/08* (2013.01)

(58) Field of Classification Search
CPC ............. G09G 3/32; G09G 2310/0267; G09G 2310/0275; G09G 2310/08
See application file for complete search history.

(56) References Cited

U.S. PATENT DOCUMENTS

| | | | |
|---|---|---|---|
| 10,013,917 B2 | 7/2018 | Kim et al. | |
| 11,232,741 B2 | 1/2022 | Hyun et al. | |
| 2011/0227885 A1 | 9/2011 | Chung et al. | |
| 2016/0064411 A1 | 3/2016 | Park et al. | |
| 2020/0394961 A1 | 12/2020 | Kim et al. | |
| 2021/0057458 A1* | 2/2021 | Kim | H01L 27/1285 |
| 2021/0248961 A1 | 8/2021 | Yang et al. | |
| 2021/0375192 A1* | 12/2021 | Jeon | G09G 3/32 |
| 2021/0376041 A1 | 12/2021 | Lee et al. | |
| 2022/0157246 A1* | 5/2022 | Chang | G09G 3/3233 |

FOREIGN PATENT DOCUMENTS

| | | |
|---|---|---|
| KR | 1020160103567 A | 9/2016 |
| KR | 1020210092870 A | 7/2021 |

* cited by examiner

*Primary Examiner* — Muhammad N Edun
(74) *Attorney, Agent, or Firm* — CANTOR COLBURN LLP

(57) ABSTRACT

A display device includes: a pixel electrically connected to a data line, a write scan line, an initialization scan line, a compensation scan line, a transmission control line, and an emission control line; a first driving circuit configured to provide a write scan signal to the write scan line and a second driving circuit configured to receive a plurality of clock signals, each of which has a time duration of one unit horizontal period and provide an initialization scan signal, a compensation scan signal, a transmission control signal, and an emission control signal to the initialization scan line, the compensation scan line, the transmission control line, and the emission control line, respectively. Each of the initialization scan signal and the compensation scan signal has an activation interval of one unit horizontal periods or more.

30 Claims, 21 Drawing Sheets

PIXEL, DRIVER AND DISPLAY DEVICE HAVING THE SAME

This application claims priority to Korean Patent Application No. 10-2022-0081813 filed on Jul. 4, 2022, and all the benefits accruing therefrom under 35 U.S.C. § 119, the content of which in its entirety is herein incorporated by reference.

BACKGROUND

Embodiments of the present disclosure described herein relate to a driver that provides a signal for improving display quality, and more particularly, relate to a pixel whose emission is controlled by the driver, and a display device having improved display quality by including the same.

A light emitting display device among display devices displays an image by using a light emitting diode that generates a light through the recombination of electrons and holes. The light emitting display device has a fast response speed and operates with low power consumption. The light emitting display device includes pixels connected to data lines and scan lines. Each of the pixels generally includes a light emitting diode, and a circuit unit for controlling the amount of current flowing to the light emitting diode. In response to a data signal, the circuit unit may control the amount of current that flows from a terminal, to which a first driving voltage is applied, to a terminal, to which a second driving voltage is applied, via a light emitting diode. In this case, a light having predetermined luminance is generated to correspond to the amount of current flowing through the light emitting diode.

SUMMARY

Embodiments of the present disclosure provide a driver, which provides a signal for securing a compensation time, a pixel whose emission is controlled by the driver, and a display device with improved display quality by securing a compensation time.

According to an embodiment, a display device includes: a pixel electrically connected to a data line, a write scan line, an initialization scan line, a compensation scan line, a transmission control line, and an emission control line; a first driving circuit that provides a write scan signal to the write scan line; and a second driving circuit configured to receive a plurality of clock signals, each of which has a time duration of one unit horizontal period and provide an initialization scan signal, a compensation scan signal, a transmission control signal, and an emission control signal to the initialization scan line, the compensation scan line, the transmission control line, and the emission control line, respectively. Each of the initialization scan signal and the compensation scan signal has an activation interval of two unit horizontal periods or more.

The initialization scan signal may include a first initialization activation interval having a first horizontal period and a second initialization activation interval having a second horizontal period greater than or equal to the first horizontal period. The compensation scan signal may include a first compensation activation interval having a third horizontal period and a second compensation activation interval having a fourth horizontal period greater than or equal to the third horizontal period.

Each of the first horizontal period and the third horizontal period may have a time duration of one unit horizontal period, and each of the second horizontal period and the fourth horizontal period may have a time duration of two unit horizontal periods or more.

Each of the first horizontal period, the second horizontal period, the third horizontal period, and the fourth horizontal period may have a time duration of two unit horizontal periods or more.

The pixel may include a display element and a pixel circuit connected to the display element. The pixel circuit may include a first transistor including a gate electrode connected to a first node, a first electrode, and a second electrode connected to a second node, a first capacitor connected between the first node and a third node, a second capacitor connected between the third node and a driving voltage line, a second transistor connected to the data line, an operation of the second transistor being controlled by the write scan signal provided to the write scan line, and a third transistor connected between the second transistor and the third node. An operation of the third transistor may be controlled by the transmission control signal provided to the transmission control line.

The pixel circuit may further include: a fourth transistor connected between the first node and the second node, where an operation of the fourth transistor is controlled by the compensation scan signal provided to the compensation scan line; a fifth transistor connected between the first node and a first initialization voltage line, where an operation of the fifth transistor is controlled by the initialization scan signal provided to the initialization scan line; a sixth transistor connected between the second node and the display element, where an operation of the sixth transistor is controlled by the emission control signal provided to the emission control line; and a seventh transistor connected between the display element and a second initialization voltage line, where an operation of the seventh transistor is controlled by the write scan signal provided to the write scan line.

The pixel circuit may further include: an eighth transistor connected between the third node and a reference voltage line, where an operation of the eighth transistor is controlled by the compensation scan signal provided to the compensation scan line. Each of the first transistor, the second transistor, the sixth transistor, and the seventh transistor may be a P-type thin film transistor having a silicon semiconductor layer. Each of the third transistor, the fourth transistor, the fifth transistor, and the eighth transistor may be an N-type thin film transistor having an oxide semiconductor layer.

The pixel circuit may further include a ninth transistor connected between the first electrode of the first transistor and the driving voltage line and a tenth transistor connected between the first electrode of the first transistor and a bias voltage line, where an operation of the tenth transistor is controlled by the write scan signal provided to the write scan line. Each of the ninth transistor and the tenth transistor being the P-type thin film transistor having the silicon semiconductor layer.

The pixel circuit may further include an eighth transistor connected between the first electrode of the first transistor and the third node, where an operation of the eighth transistor is controlled by the compensation scan signal provided to the compensation scan line.

The pixel circuit may be configured to operate in a write cycle interval and a hold cycle interval. In the write cycle interval, a data signal provided through the data line may be delivered to the pixel circuit. In the hold cycle interval, an anode of the display element may be initialized.

The write scan signal may include a first write activation interval overlapping the write cycle interval and a second write activation interval overlapping the hold cycle interval. The data signal may be delivered to the pixel in the first write activation interval, and the anode of the display element may be initialized in the second write activation interval.

Each of the first write activation interval and the second write activation interval may be one unit horizontal period or more.

A length of the first write activation interval may be different from a length of the second write activation interval.

The transmission control signal may include a transmission activation interval, and the transmission activation interval may overlap the first write activation interval.

The transmission activation interval of the transmission control signal may not overlap the hold cycle interval.

The second driving circuit may include: a first sub-driving circuit that receives first clock signals and outputs the emission control signal; a second sub-driving circuit that receives second clock signals and outputs the initialization scan signal and the compensation scan signal; and a third sub-driving circuit that receives third clock signals and outputs the transmission control signal. A time duration of each of the first clock signals may be one unit horizontal period. A time duration of each of the second clock signals may be one unit horizontal period. A time duration of each of the third clock signals may be one unit horizontal period.

According to an embodiment, a display device includes" a pixel electrically connected to a data line, a write scan line, an initialization scan line, a compensation scan line, a transmission control line, and an emission control line and including a pixel circuit and a display element; and a driving circuit configured to provide a write scan signal, an initialization scan signal, a compensation scan signal, a transmission control signal, and an emission control signal to the write scan line, the initialization scan line, the compensation scan line, the transmission control line, and the emission control line, respectively. The initialization scan signal includes a first initialization activation interval having a first horizontal period and a second initialization activation interval having a second horizontal period greater than or equal to the first horizontal period. The compensation scan signal includes a first compensation activation interval having a third horizontal period and a second compensation activation interval having a fourth horizontal period greater than or equal to the third horizontal period. Each of the second horizontal period and the fourth horizontal period has a time duration of two unit horizontal periods or more.

The driving circuit may include: a first sub-driving circuit configured to receive first clock signals and output the emission control signal; a second sub-driving circuit configured to receive second clock signals and output the initialization scan signal and the compensation scan signal; a third sub-driving circuit configured to receive third clock signals and output the transmission control signal; and a scan driving circuit configured to receive fourth clock signals and output the write scan signal.

The pixel circuit may be configured to operate in a write cycle interval and a hold cycle interval. The write scan signal may include a first write activation interval overlapping the write cycle interval and a second write activation interval overlapping the hold cycle interval. A data signal may be delivered to the pixel in the first write activation interval, and an anode of the display element may be initialized in the second write activation interval.

The transmission control signal may include a transmission activation interval. The transmission activation interval may overlap the first write activation interval and may not overlap the hold cycle interval.

According to an embodiment, a display device includes: a pixel electrically connected to a data line, a write scan line, an initialization scan line, a compensation scan line, a transmission control line, and an emission control line and including a pixel circuit, which includes a plurality of transistors and a capacitor, and a display element; and a driving circuit configured to provide a write scan signal, an initialization scan signal, a compensation scan signal, a transmission control signal, and an emission control signal to the write scan line, the initialization scan line, the compensation scan line, the transmission control line, and the emission control line, respectively. The pixel circuit is configured to operate in a write cycle interval and a hold cycle interval. The write scan signal includes a first write activation interval overlapping the write cycle interval and a second write activation interval overlapping the hold cycle interval. In the first write activation interval, a data signal provided through the data line is delivered to the capacitor, and an anode of the display element is primarily initialized. In the second write activation interval, the data signal is blocked from being delivered to the capacitor, and the anode of the display element is secondarily initialized.

According to an embodiment, a driver includes: a first driving circuit configured to provide a write scan signal to a write scan line connected to a pixel; and a second driving circuit configured to receive a plurality of clock signals, each of which has a time duration of one unit horizontal period and provide an initialization scan line, a compensation scan line, a transmission control line, and an emission control line, which are connected to the pixel, with an initialization scan signal having an activation interval of two unit horizontal periods or more, a compensation scan signal having an activation interval of two unit horizontal periods or more, a transmission control signal, and an emission control signal, respectively.

The initialization scan signal may include a first initialization activation interval having a first horizontal period and a second initialization activation interval having a second horizontal period greater than or equal to the first horizontal period. The compensation scan signal may include a first compensation activation interval having a third horizontal period and a second compensation activation interval having a fourth horizontal period greater than or equal to the third horizontal period.

The write scan signal may include a first write activation interval overlapping a write cycle interval and a second write activation interval overlapping a hold cycle interval. The transmission control signal may include a transmission activation interval. The transmission activation interval may overlap the first write activation interval and may not overlap the hold cycle interval.

The second driving circuit may include: a first sub-driving circuit configured to receive first clock signals and output the emission control signal; a second sub-driving circuit configured to receive second clock signals and output the initialization scan signal and the compensation scan signal; and a third sub-driving circuit configured to receive third clock signals and output the transmission control signal. A time duration of each of the first clock signals may be one unit horizontal period. A time duration of each of the second clock signals may be one unit horizontal period. A time duration of each of the third clock signals may be one unit horizontal period.

According to an embodiment, a pixel includes: a display element and a pixel circuit connected to the display element.

The pixel circuit includes: a first transistor including a gate electrode connected to a first node, a first electrode, and a second electrode connected to a second node; a first capacitor connected between the first node and a third node; a second capacitor connected between the third node and a driving voltage line; a second transistor connected to a data line, where an operation of the second transistor is controlled by a write scan signal provided to a write scan line; and a third transistor connected between the second transistor and the third node, where an operation of the third transistor is controlled by a transmission control signal provided to a transmission control line.

The pixel circuit may further include: a fourth transistor connected between the first node and the second node, where an operation of the fourth transistor is controlled by a compensation scan signal provided to a compensation scan line; a fifth transistor connected between the first node and a first initialization voltage line, where an operation of the fifth transistor is controlled by an initialization scan signal provided to an initialization scan line; a sixth transistor connected between the second node and the display element, where an operation of the sixth transistor is controlled by an emission control signal provided to an emission control line; and a seventh transistor connected between the display element and a second initialization voltage line, where an operation of the seventh transistor is controlled by the write scan signal provided to the write scan line.

The pixel circuit may further include an eighth transistor connected between the third node and a reference voltage line, where an operation of the eighth transistor is controlled by the compensation scan signal provided to the compensation scan line. Each of the first transistor, the second transistor, the sixth transistor, and the seventh transistor may be a P-type thin film transistor having a silicon semiconductor layer. Each of the third transistor, the fourth transistor, the fifth transistor, and the eighth transistor may be an N-type thin film transistor having an oxide semiconductor layer.

The pixel circuit may further include: a ninth transistor connected between the first electrode of the first transistor and the driving voltage line; and a tenth transistor connected between the first electrode of the first transistor and a bias voltage line, where an operation of the tenth transistor is controlled by the write scan signal provided to the write scan line. Each of the ninth transistor and the tenth transistor being the P-type thin film transistor having the silicon semiconductor layer.

The pixel circuit may further include an eighth transistor connected between the first electrode of the first transistor and the third node, where an operation of the eighth transistor is controlled by the compensation scan signal provided to the compensation scan line.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
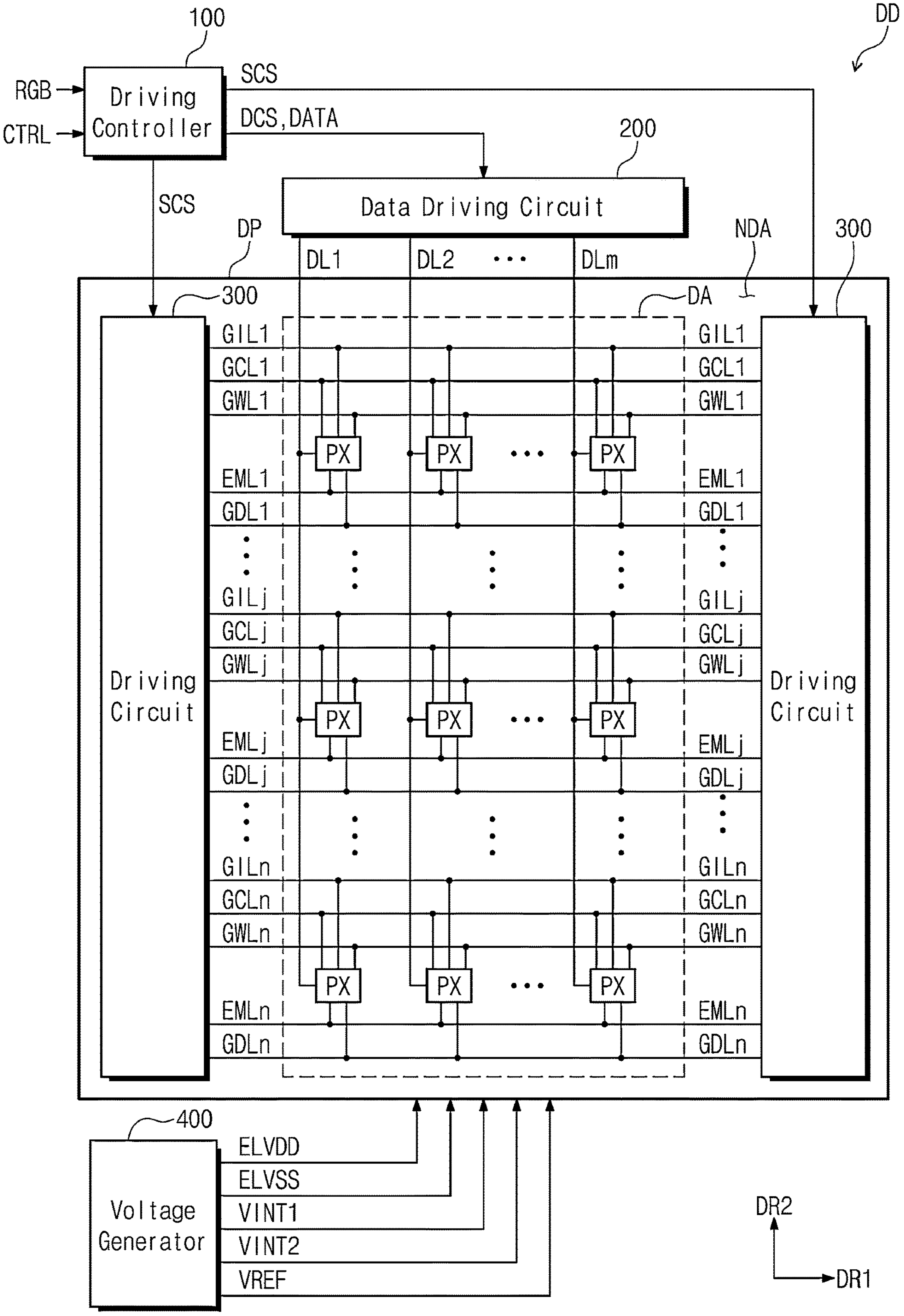
FIG. 1 is a block diagram of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device DD, according to an embodiment of the present disclosure.

Referring to FIG. 1, the display device DD may include a display panel DP, a driving controller 100, and a panel driver. According to an embodiment of the present disclosure, the panel driver may include a data driving circuit 200 (or data driver), driving circuits 300, and a voltage generator 400.

The display panel DP may include a display area DA and a non-display area NDA. The display panel DP may include a plurality of pixels PX arranged in the display area DA. The display panel DP may further include initialization scan lines GIL1 to GILn, compensation scan lines GCL1 to GCLn, write scan lines GWL1 to GWLn, emission control lines EML1 to EMLn, transmission control lines GDL1 to GDLn, and data lines DL1 to DLm.

The display panel DP may be configured to operate in a first mode operating at a predetermined frequency (e.g., 60 Hz, 120 Hz, or 240 Hz) or a second mode operating at a variable frame frequency. For example, the variable frame frequency may be variously modified within a range of 1 Hz to 240 Hz, but is not particularly limited thereto. As the display panel DP operates in a high-speed mode, 1 unit horizontal period ("1H" period) may be gradually reduced. That is, as the frame frequency of the display panel DP increases, the interval of 1 unit horizontal period may be decreased. In this case, when a length of a compensation interval is 1 unit horizontal period, the compensation interval may not be sufficiently secured. According to an embodiment of the present disclosure, the compensation interval may have a length of 2 unit horizontal periods or more. Accordingly, as a compensation time is sufficiently secured even when one unit horizontal period is reduced by restriction driving, display quality may be improved.

The driving controller 100 receives an image signal RGB and a control signal CTRL. The driving controller 100 generates an image data signal DATA by converting a data format of the image signal RGB so as to be suitable for the interface specification of the data driving circuit 200. The driving controller 100 outputs a first control signal SCS and a second control signal DCS.

The data driving circuit 200 receives the second control signal DCS and the image data signal DATA from the driving controller 100. The data driving circuit 200 converts the image data signal DATA into data signals and then outputs the data signals to the data lines DL1 to DLm. The data signals refer to analog voltages corresponding to grayscale values of the image data signal DATA. The data lines DL1 to DLm may be arranged in a first direction DR1, and each of the data lines DL1 to DLm may extend in a second direction DR2.

The driving circuit 300 may be disposed in the non-display area NDA of the display panel DP. However, an embodiment is not particularly limited thereto. For example, at least part of the driving circuit 300 may be disposed in the display area DA. The plurality of driving circuits 300 may be provided. For example, the plurality of the driving circuits 300 may be spaced from each other with the display area DA interposed therebetween. However, this is only an example. For example, one of the two driving circuits 300 illustrated in FIG. 1 may be omitted to avoid redundancy.

Each of the plurality of pixels PX includes a display element ED (see FIG. 2) and a pixel circuit PXC (see FIG. 2) for controlling the emission of the display element ED. The pixel circuit PXC may include one or more transistors and one or more capacitors. The driving circuits 300 may include transistors formed through the same process as the pixel circuit PXC.

The initialization scan lines GIL1 to GILn, the compensation scan lines GCL1 to GCLn, the write scan lines GWL1 to GWLn, the emission control lines EML1 to EMLn, and the transmission control lines GDL1 to GDLn may be electrically connected to the driving circuits 300 to receive signals from the driving circuits 300. For example, the one initialization scan line GIL1, the one compensation scan line GCL1, the one write scan line GWL1, the one emission control line EML1, and the one transmission control line GDL1 may receive the same signal from the two driving circuits 300.

The initialization scan lines GIL1 to GILn, the compensation scan lines GCL1 to GCLn, the write scan lines GWL1 to GWLn, the emission control lines EML1 to EMLn, and the transmission control lines GDL1 to GDLn may be extended in the first direction DR1. The initialization scan lines GIL1 to GILn, the compensation scan lines GCL1 to GCLn, the write scan lines GWL1 to GWLn, the emission control lines EML1 to EMLn, and the transmission control lines GDL1 to GDLn may be spaced from each other in the second direction DR2.

Each of the plurality of pixels PX may be electrically connected to four scan lines, one emission control line, and one data line. For example, as shown in FIG. 1, a first row of pixels may be connected to the scan lines GIL1 GCL1, GWL1, and GDL1 and the emission control line EML1. A first column of pixels may be connected to the data line DL1. Furthermore, a j-th row of pixels may be connected to the scan lines GILj, GCLj, GWLj, and GDLj and the emission control line EMLj.

The voltage generator 400 generates voltages necessary to operate the display panel DP. In an embodiment, the voltage generator 400 may generate a first driving voltage ELVDD, a second driving voltage ELVSS, a first initialization voltage VINT1, a second initialization voltage VINT2, and a reference voltage VREF.

Figure 2:
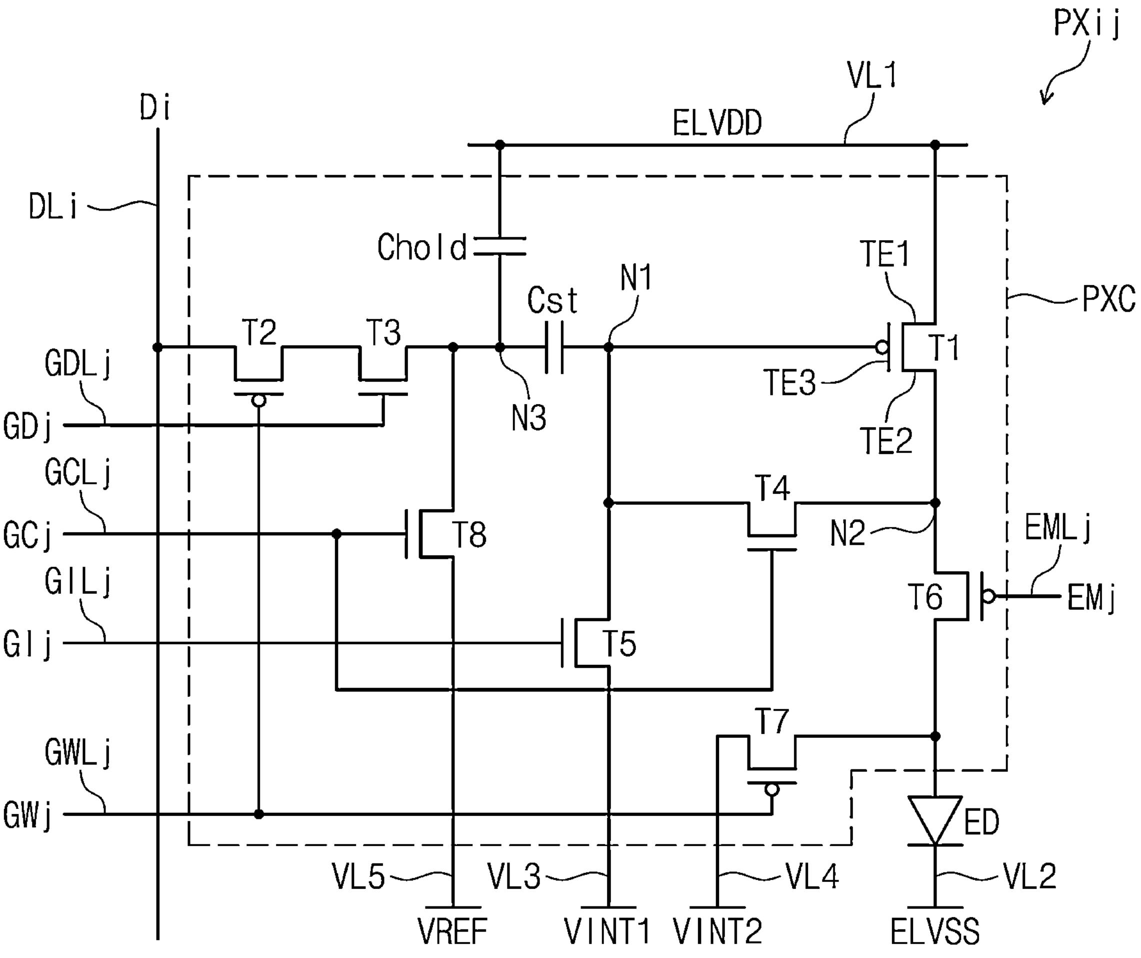
FIG. 2 is a circuit diagram of a pixel according to an embodiment of the present disclosure.

FIG. 2 is a circuit diagram of a pixel PXij, according to an embodiment of the present disclosure.

Referring to FIGS. 1 and 2, the pixel PXij may be connected to the j-th initialization scan line GILj, the j-th compensation scan line GCLj, the j-th write scan line GWLj, the j-th emission control line EMLj, the j-th transmission control line GDLj, and the i-th data line DLi. Each of the plurality of pixels PX shown in FIG. 1 may have the same circuit configuration as the pixel PXij shown in FIG. 2.

According to an embodiment of the present disclosure, the pixel PXij includes the pixel circuit PXC and the at least one display element ED. The pixel circuit PXC may include first to eighth transistors T1, T2, T3, T4, T5, T6, T7, and T8, a first capacitor Cst, and a second capacitor Chold.

The display element ED may be a light emitting diode. In an embodiment, it is described that the one pixel PXij includes the display element ED, but an embodiment is not limited thereto. For example, the one pixel PXij may be connected to a plurality of display elements connected in parallel or in series in another embodiment.

In an embodiment, each of the third, fourth, fifth, and eighth transistors T3, T4, T5, and T8 among the first to eighth transistors T1 to T8 is an N-type thin film transistor having an oxide semiconductor as a semiconductor layer. Each of the first, second, sixth, and seventh transistors T1, T2, T6, and T7 among the first to eighth transistors T1 to T8 is a P-type thin film transistor having a silicon semiconductor layer, for example, a low-temperature polycrystalline silicon ("LTPS") semiconductor layer. However, the present disclosure is not limited thereto. For example, all of the first to eighth transistors T1 to T8 may be P-type transistors or N-type transistors in another embodiment. In still another embodiment, at least one of the first to eighth transistors T1 to T8 may be an N-type transistor and the others thereof may be P-type transistors. Moreover, the circuit configuration of a pixel according to an embodiment of the present disclosure is not limited to FIG. 2. The pixel circuit PXC illustrated in FIG. 2 is only an example. For example, the configuration of the pixel circuit PXC may be modified and implemented.

The j-th initialization scan line GILj may deliver an initialization scan signal GIj; the j-th compensation scan line GCLj may transmit a compensation scan signal GCj; the j-th write scan line GWLj may transmit a write scan signal GWj; the j-th emission control line EMLj may transmit an emission control signal EMj; the j-th transmission control line GDLj may transmit a transmission control signal GDj; and, the i-th data line DLi may transmit a data signal Di. The data signal Di may have a voltage level corresponding to a grayscale value of the image data signal DATA output from the driving controller 100.

Besides, the pixel PXij may be connected to first to fifth driving voltage lines VL1, VL2, VL3, VL4, and VL5. The first driving voltage line VL1 may deliver the first driving voltage ELVDD and may be referred to as a "driving voltage line". The second driving voltage line VL2 may deliver the second driving voltage ELVS S. The third driving voltage line VL3 may deliver the first initialization voltage VINT1 and may be referred to as a "first initialization voltage line". The fourth driving voltage line VL4 may deliver the second initialization voltage VINT2 and may be referred to as a "second initialization voltage line". The fifth driving voltage line VL5 may deliver the reference voltage VREF and may be referred to as a "reference voltage line". The reference voltage VREF may have the same voltage level as the first driving voltage ELVDD, but is not limited thereto.

The first transistor T1 may include a first electrode TE1, a second electrode TE2, and a gate electrode TE3. The first transistor T1 may be referred to as a "driving thin film transistor". The first electrode TE1 may be connected to the first driving voltage line VL1; the second electrode TE2 may be connected to a second node N2; and, the gate electrode TE3 may be connected to a first node N1. The first capacitor Cst may be connected between the first node N1 and a third node N3. The second capacitor Chold may be connected between the third node N3 and the first driving voltage line VL1.

The second transistor T2 and the third transistor T3 may be connected between the data line DLi and the third node N3. The third transistor T3 may be connected between the second transistor T2 and the third node N3. The third transistor T3 may block the transmission of the data signal Di provided from the second transistor T2.

An operation of the second transistor T2 may be controlled in response to the write scan signal GWj provided to the j-th write scan line GWLj. The second transistor T2 may be turned on in response to the write scan signal GWj to deliver the data signal Di received from the data line DLi to the third transistor T3. An operation of the third transistor T3 may be controlled in response to the transmission control signal GDj provided to the j-th transmission control line GDLj. The second transistor T2 may be referred to as a "switching thin film transistor", and the third transistor T3 may be referred to as a "transmission control thin film transistor".

The fourth transistor T4 may be connected between the first node N1 and the second node N2. An operation of the fourth transistor T4 may be controlled in response to the compensation scan signal GCj provided to the j-th compensation scan line GCLj. The fourth transistor T4 may be turned on in response to the compensation scan signal GCj to connect the gate electrode TE3 of the first transistor T1 to the second electrode TE2 of the first transistor T1.

The fifth transistor T5 may be connected between the first node N1 and the third driving voltage line VL3 (or referred to as a "first initialization voltage line"). An operation of the fifth transistor T5 may be controlled in response to the initialization scan signal GIj provided to the j-th initialization scan line GILj. The fifth transistor T5 may be turned on in response to the initialization scan signal GIj to initialize a voltage of the gate electrode TE3 of the first transistor T1 by delivering the first initialization voltage VINT1 to the gate electrode TE3 of the first transistor T1.

The sixth transistor T6 may be connected between the second node N2 and the display element ED. An operation of the sixth transistor T6 may be controlled by the emission control signal EMj provided to the j-th emission control line EMLj. The sixth transistor T6 may be turned on in response to the emission control signal EMj. As the sixth transistor T6 is turned on, a current path may be formed between the first driving voltage line VL1 and the display element ED through the first transistor T1 and the sixth transistor T6. That is, the sixth transistor T6 may electrically connect the second electrode TE2 of the first transistor T1 to the display element ED in response to the emission control signal EMj.

The seventh transistor T7 may be connected between the display element ED and the fourth driving voltage line VL4 (or referred to as a "second initialization voltage line"). An operation of the seventh transistor T7 may be controlled by the write scan signal GWj provided to the j-th write scan line GWLj. The seventh transistor T7 may be turned on in response to the write scan signal GWj to electrically connect an anode of the display element ED to the fourth driving voltage line VL4.

The eighth transistor T8 may be connected between the third node N3 and the fifth driving voltage line VL5 (or referred to as a "reference voltage line"). An operation of the eighth transistor T8 may be controlled by the compensation scan signal GCj provided to the j-th compensation scan line GCLj.

The display element ED may include the anode connected to a second electrode of the sixth transistor T6 and a cathode connected to the second driving voltage line VL2.

Figure 3:
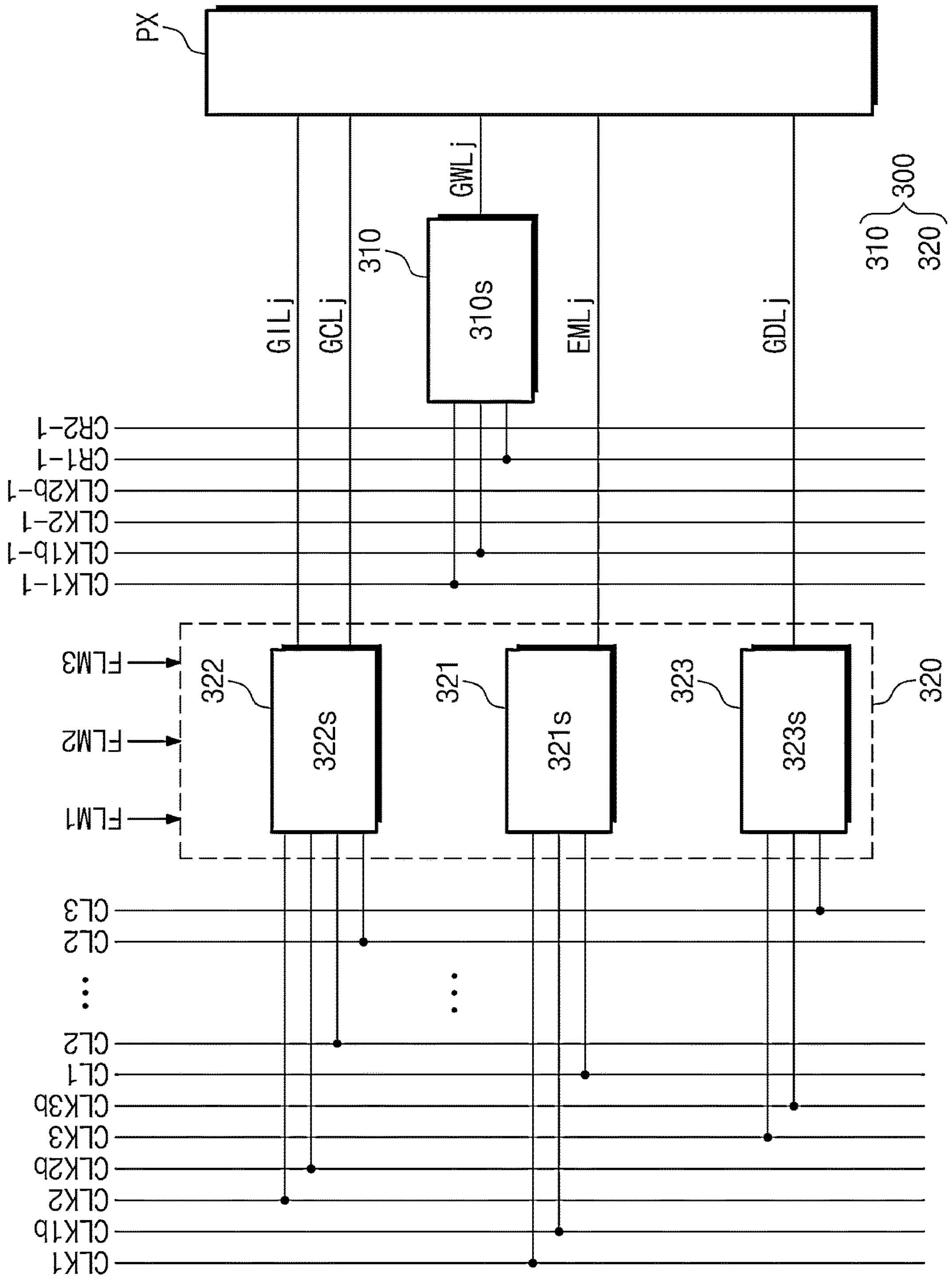
FIG. 3 is a block diagram illustrating a driving circuit and a pixel, according to an embodiment of the present disclosure.
Figure 4:
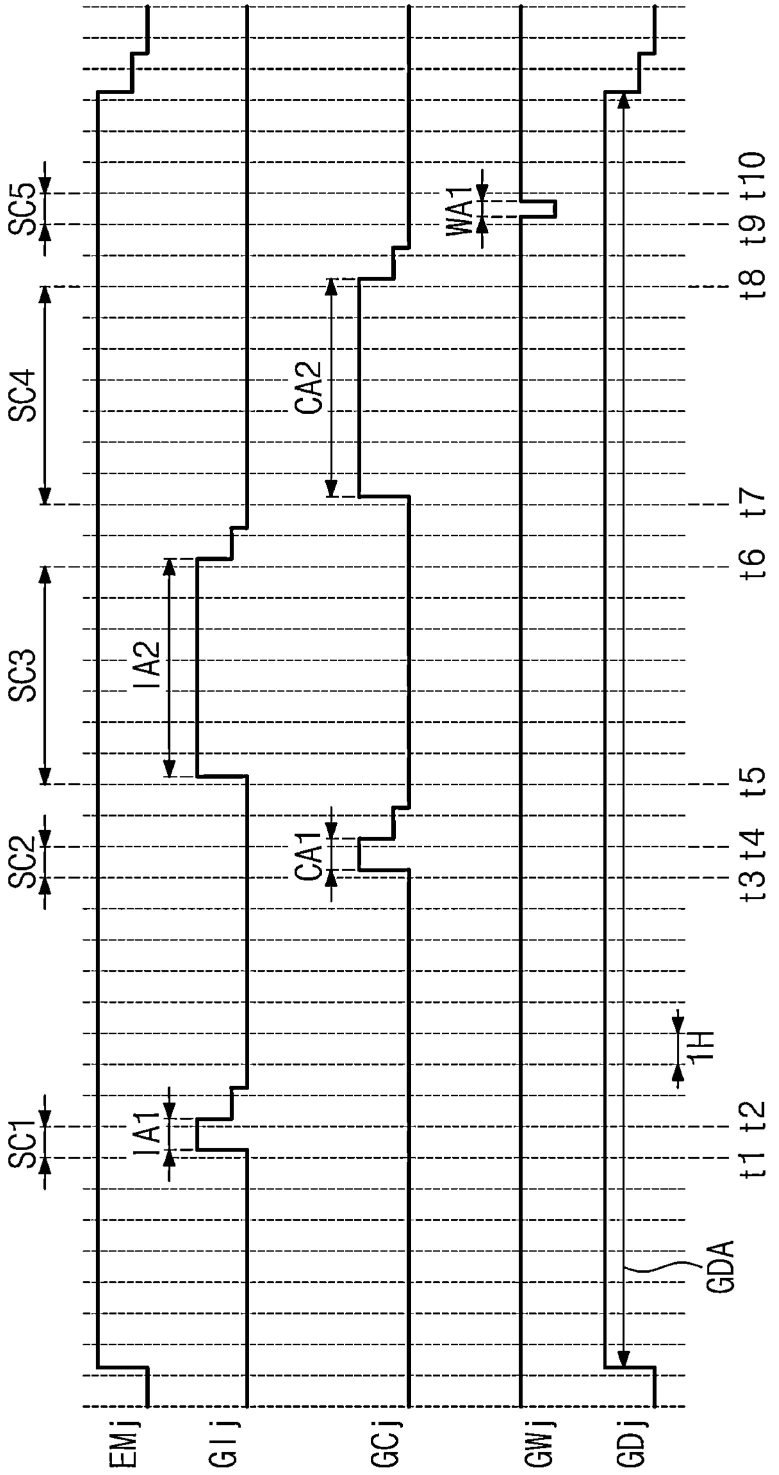
FIG. 4 is a timing diagram for describing an operation of a pixel in a write cycle interval, according to an embodiment of the present disclosure.

FIG. 3 is a block diagram illustrating the driving circuit 300 and the pixel PX, according to an embodiment of the present disclosure. FIG. 4 is a timing diagram for describing an operation of a pixel in a write cycle interval, according to an embodiment of the present disclosure.

Referring to FIGS. 1 and 3, each of the driving circuits 300 may include a first driving circuit 310 and a second driving circuit 320. The first driving circuit 310 may be referred to as a "scan driving circuit". The second driving circuit 320 may include a first sub-driving circuit 321, a second sub-driving circuit 322, and a third sub-driving circuit 323. Each of the driving circuits 300 may be referred to as a "driver".

Each of the first driving circuit 310, the first sub-driving circuit 321, the second sub-driving circuit 322, and the third sub-driving circuit 323 may include a plurality of stages. Each of the plurality of stages included in the first driving circuit 310 may output the received clock signal as an output signal. Each of the plurality of stages included in each of the first sub-driving circuit 321, the second sub-driving circuit 322, and the third sub-driving circuit 323 may output a predetermined voltage, which is received, as an output signal. A first start signal FLM1, a second start signal FLM2, and a third start signal FLM3 may be provided to first stages of the first sub-driving circuit 321, the second sub-driving circuit 322, and the third sub-driving circuit 323, respectively.

FIG. 3 shows one first stage 310*s* of the first driving circuit 310 connected to the j-th row of pixels PX, one second stage 321*s* of the first sub-driving circuit 321 connected to the j-th row of pixels PX, one third stage 322*s* of the second sub-driving circuit 322 connected to the j-th row of pixels PX, and one fourth stage 323*s* of the third sub-driving circuit 323 connected to the j-th row of pixels PX.

Referring to FIGS. 3 and 4, the first stage 310*s* may receive at least some of first write clock signals CLK1-1 and CLK1*b*-1, second write clock signals CLK2-1 and CLK2*b*-1, and carry signals CR1-1 and CR2-1 and may output the write scan signal GWj to the write scan line GWLj.

The second stage 321*s* may receive first clock signals CLK1 and CLK1*b* and a first carry signal CL1 and may output the emission control signal EMj to the emission control line EMLj. The third stage 322*s* may receive second clock signals CLK2 and CLK2*b* and second carry signals CL2, may output the initialization scan signal GIj to the initialization scan line GILj, and may output the compensation scan signal GCj to the compensation scan line GCLj. The fourth stage 323*s* may receive third clock signals CLK3 and CLK3*b* and a third carry signal CL3 and may output the transmission control signal GDj to the transmission control line GDLj. The first clock signals CLK1 and CLK1*b*, the second clock signals CLK2 and CLK2*b*, and the third clock signals CLK3 and CLK3*b* may each be signals having a time duration of 1 unit horizontal period.

Referring to FIG. 4, waveforms of the emission control signal EMj, the initialization scan signal GIj, the compensation scan signal GCj, the write scan signal GWj, and the transmission control signal GDj are shown.

A write cycle interval may include a first interval SC1, a second interval SC2, a third interval SC3, a fourth interval SC4, and a fifth interval SC5. The first interval SC1 may be referred to as a "first initialization interval"; the second interval SC2 may be referred to as a "reference voltage write interval"; the third interval SC3 may be referred to as a "second initialization interval"; the fourth interval SC4 may be referred to as a "compensation interval"; and the fifth interval SC5 may be referred to as a "data write and anode initialization interval".

Each of the initialization scan signal GIj and the compensation scan signal GCj may have an activation interval of 2 unit horizontal periods or more. For example, the initialization scan signal GIj may include a first initialization activation interval IA1 having a first horizontal period and a second initialization activation interval IA2 having a second horizontal period. The compensation scan signal GCj may include a first compensation activation interval CA1 having a third horizontal period, and a second compensation activation interval CA2 having a fourth horizontal period.

Each of the first initialization activation interval IA1 and the first compensation activation interval CA1 may be 1 unit horizontal period. Each of the second initialization activation interval IA2 and the second compensation activation interval CA2 may be 2 unit horizontal periods or more. For example, a time between a first time point t1 at which the first initialization activation interval IA1 starts and a second time point t2 at which the first initialization activation interval IA1 ends may be 1 unit horizontal period (1H). A time between a third time point t3 at which the first compensation activation interval CA1 starts and a fourth time point t4 at which the first compensation activation interval CA1 ends may be 1 unit horizontal period. A time between a fifth time point t5 at which the second initialization activation interval IA2 starts and a sixth time point t6 at which the second initialization activation interval IA2 ends may be 7 unit horizontal periods. A time between a seventh time point t7 at which the second compensation activation interval CA2 starts and an eighth time point t8 at which the second compensation activation interval CA2 ends may be 7 unit horizontal periods.

Each of the second stage 321*s*, the third stage 322*s*, and the fourth stage 323*s* may provide a predetermined direct current (DC) voltage as an output signal, not a clock signal as an output. Accordingly, even when output widths (i.e., time durations) of the second initialization activation interval IA2 and the second compensation activation interval CA2 are expanded, there is no need to additionally provide clock signals corresponding to the second initialization activation interval IA2 and the second compensation activation interval CA2.

Unlike an embodiment of the present disclosure, in the case where the output time duration of each of the second initialization activation interval IA2 and the second compensation activation interval CA2 is 7 unit horizontal periods when the initialization scan signal GIj and the compensation scan signal GCj are clock signals, 14 clock wires and 7 carry wires may be required. In contrast, according to an embodiment of the present disclosure, the initialization scan signal GIj and the compensation scan signal GCj may be signals formed by outputting a predetermined DC voltage. Accordingly, only 2 clock wires and 9 carry wires according to an output timing difference between the initialization scan signal GIj and the compensation scan signal GCj may be required. Therefore, according to an embodiment of the present disclosure, because there is no need to add clock lines for additionally providing clock signals even when the output time duration of each of the second initialization activation interval IA2 and the second compensation activation interval CA2 is expanded, the size area of a dead space may not increase significantly.

Furthermore, because each of the initialization scan signal GIj, the compensation scan signal GCj, the emission control signal EMj, and the transmission control signal GDj is a signal formed by an output of the predetermined DC voltage, not an output of a clock signal, a waveform of a level lower than an activation level may be generated after a time point at which each activation interval ends.

Figure 5A:
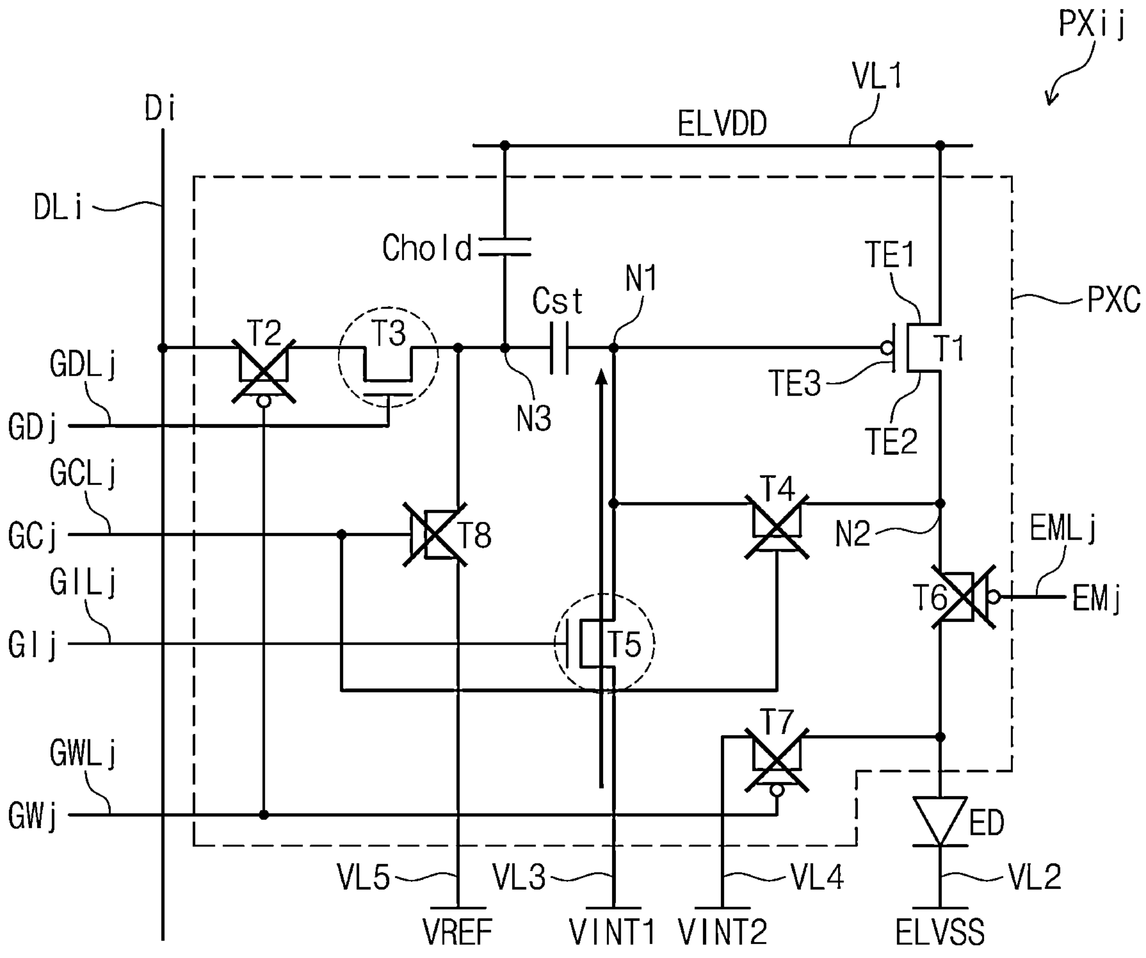
FIG. 5A is a diagram for describing an operation of a pixel in a first interval and a third interval shown in FIG. 4.

FIG. 5A is a diagram for describing an operation of a pixel in the first interval SC1 and the third interval SC3 shown in FIG. 4. FIG. 5A illustrates an operation of the pixel circuit PXC in each of the first interval SC1 and the third interval SC3.

Referring to FIGS. 4 and 5A, each of the first interval SC1 and the third interval SC3 is a step in which the first initialization voltage VINT1 is provided to the first node N1. In each of the first interval SC1 and the third interval SC3, the initialization scan signal GIj may have an active level (e.g., a high level). In each of the first interval SC1 and the third interval SC3, the second transistor T2, the fourth transistor T4, the sixth transistor T6, the seventh transistor T7, and the eighth transistor T8 may be turned off, and the third transistor T3 and the fifth transistor T5 may be turned on.

The first initialization voltage VINT1 provided through the third driving voltage line VL3 through the fifth transistor T5 thus turned on may be delivered to the first node N1. That is, a voltage of the gate electrode TE3 of the first transistor T1 may be initialized.

It is illustrated that the transmission control signal GDj is at an active level (e.g., a high level) in each of the first interval SC1 and the third interval SC3, but is not particularly limited thereto. For example, in each of the first interval SC1 and the third interval SC3, the transmission control signal GDj may be at an inactive level (e.g., a low level).

Figure 5B:
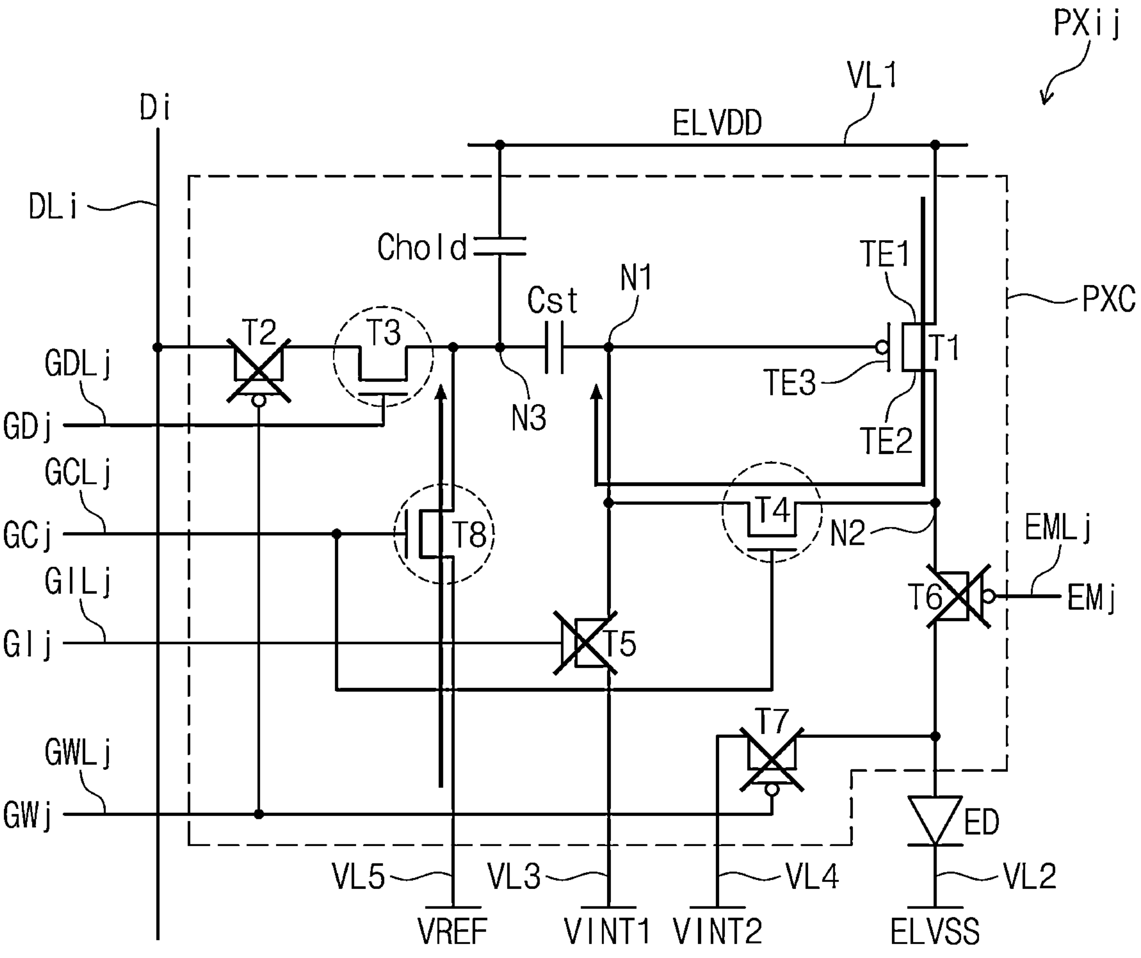
FIG. 5B is a diagram for describing an operation of a pixel in a second interval and a fourth interval shown in FIG. 4.

FIG. 5B is a diagram for describing an operation of a pixel in the second interval SC2 and the fourth interval SC4 shown in FIG. 4. FIG. 5B illustrates an operation of the pixel circuit PXC in each of the second interval SC2 and the fourth interval SC4.

Referring to FIGS. 4 and 5B, each of the second interval SC2 and the fourth interval SC4 is a step in which the reference voltage VREF is provided to the third node N3. In each of the second interval SC2 and the fourth interval SC4, the compensation scan signal GCj may have an active level (e.g., a high level). The fourth transistor T4 and the eighth transistor T8 may be turned on in response to the compensation scan signal GCj. Accordingly, the eighth transistor T8 may apply the reference voltage VREF to the third node N3. The first transistor T1 may be diode-connected through the fourth transistor T4. Accordingly, a voltage obtained by removing a threshold voltage of the first transistor T1 from the first driving voltage ELVDD may be applied to the second node N2.

The second interval SC2 may be an interval in which an influence of previous data is removed. A length of the fourth interval SC4 may be greater than or equal to a length of the second interval SC2. The fourth interval SC4 may be an interval in which the threshold voltage of the first transistor T1 is substantially compensated, and the compensation time may correspond to the length of the fourth interval SC4. According to an embodiment of the present disclosure, the length of the fourth interval SC4 may have 2 unit horizontal periods or more, for example 7 unit horizontal periods. Accordingly, even when one unit horizontal period is reduced, the length of the fourth interval SC4 may be sufficiently secured. Accordingly, the threshold voltage of the first transistor T1 may be sufficiently compensated. FIG. 4 illustrates that a length of the fourth interval SC4 is 7 unit horizontal periods, but the present disclosure is not limited thereto. For example, the length of the fourth interval SC4 may be variously modified, for example, 4 unit horizontal periods, 8 unit horizontal periods, or 10 unit horizontal periods.

Figure 5C:
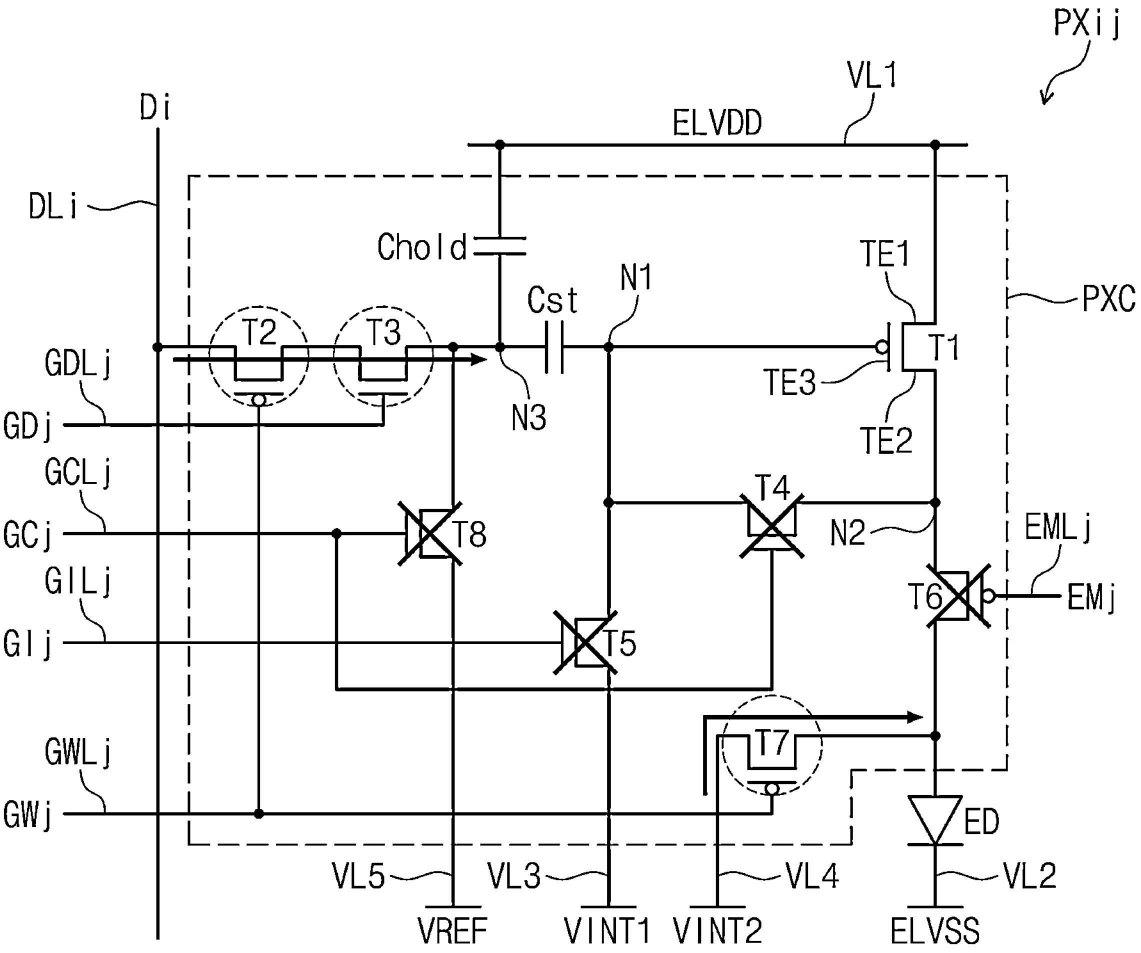
FIG. 5C is a diagram for describing an operation of a pixel in a fifth interval shown in FIG. 4.

FIG. 5C is a diagram for describing an operation of a pixel in the fifth interval SC5 shown in FIG. 4. FIG. 5C illustrates an operation of the pixel circuit PXC in the fifth interval SC5.

Referring to FIGS. 4 and 5C, the fifth interval SC5 is a step in which an anode of the display element ED is initialized and the data signal Di is input. The fifth interval SC5 may be an interval in which the anode of the display element ED is primarily initialized. In the fifth interval SC5, the write scan signal GWj may have an active level (e.g., a low level). The second transistor T2 and the seventh transistor T7 may be turned on in response to the write scan signal GWj.

The write scan signal GWj may include a first write activation interval WA1 overlapping a write cycle interval. For example, the write scan signal GWj may include the first write activation interval WA1 during a portion of the write cycle interval. The transmission control signal GDj may include a transmission activation interval GDA. The transmission activation interval GDA may overlap the first write activation interval WA1. FIG. 4 illustrates that the transmission activation interval GDA overlaps all of the first to fifth intervals SC1, SC2, SC3, SC4, and SC5. However, as long as the transmission activation interval GDA overlaps the first write activation interval WA1, a time duration of the transmission activation interval GDA may be variously modified.

When the second transistor T2 and the third transistor T3 are turned on, a voltage of a first electrode of the first capacitor Cst connected to the third node N3 may be changed from the reference voltage VREF to a data voltage (hereinafter, referred to as "Vdata") corresponding to the data signal Di. In this case, a voltage of a second electrode of the first capacitor Cst connected to the first node N1 may be changed as much as the voltage of the first electrode is changed. For example, the voltage of the second electrode of the first capacitor Cst may be changed by "Vdata−VREF". Accordingly, the voltage of the first node N1 may be a voltage (e.g., "ELVDD−Vth+Vdata−VREF") obtained by subtracting a threshold voltage (hereinafter, referred to as "Vth") of the first transistor T1 from the first driving voltage ELVDD and adding a difference between the data voltage and the reference voltage VREF.

When the seventh transistor T7 is turned on and the sixth transistor T6 is turned off, the second initialization voltage VINT2 may be applied to the anode of the display element ED. Accordingly, the display element ED may be initialized. According to an embodiment of the present disclosure, because the seventh transistor T7 is controlled by the same signal (e.g., the write scan signal GWj) as that of the second transistor T2, data writing and anode initialization operations may be performed simultaneously. However, the present disclosure is not particularly limited thereto. For example, the seventh transistor T7 may be controlled by a signal different from that of the second transistor T2.

Figure 6:
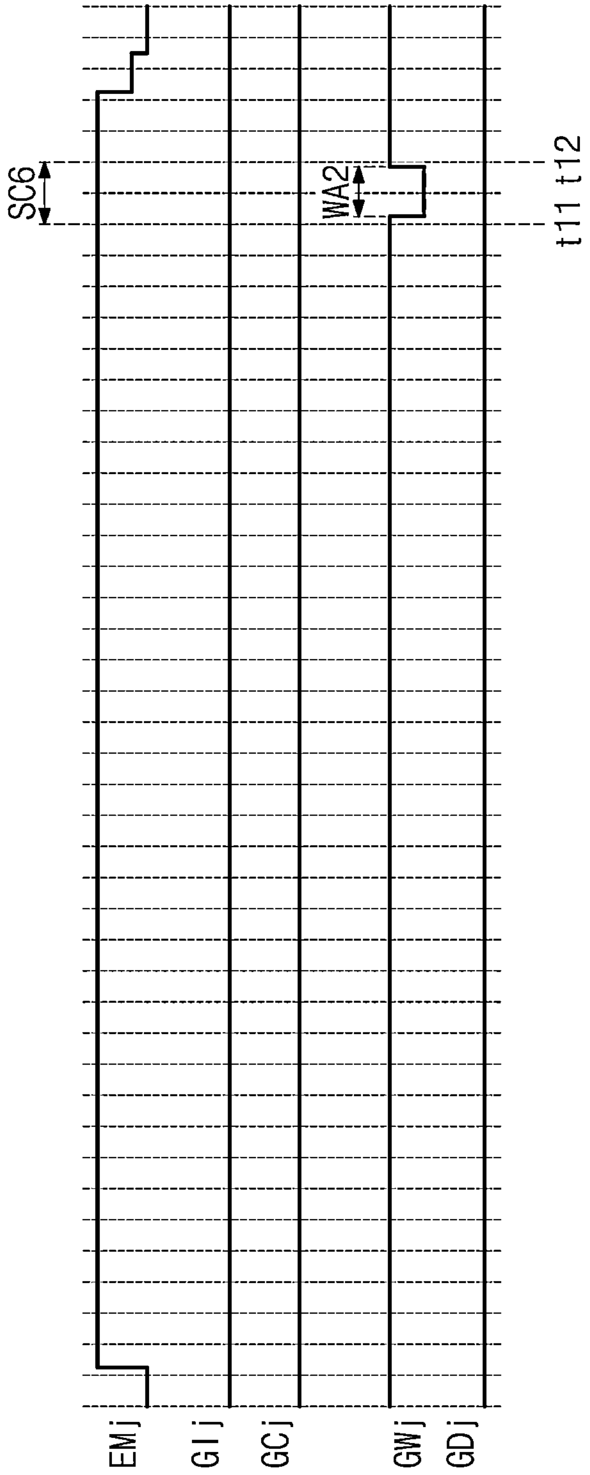
FIG. 6 is a timing diagram for describing an operation of a pixel in a hold cycle interval, according to an embodiment of the present disclosure.
Figure 7:
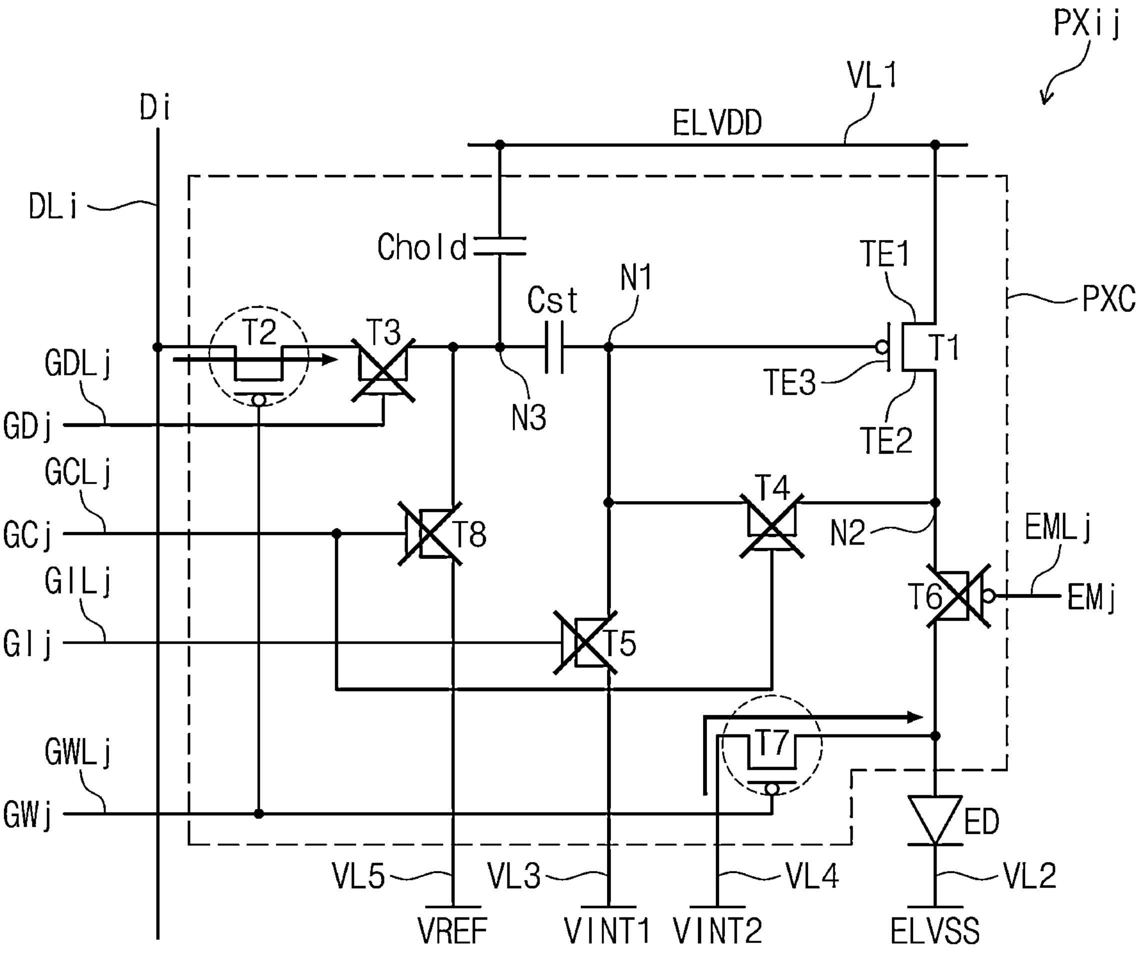
FIG. 7 is a diagram for describing an operation of a pixel in the sixth interval shown in FIG. 6.

FIG. 6 is a timing diagram for describing an operation of a pixel in a hold cycle interval, according to an embodiment of the present disclosure. FIG. 7 is a diagram for describing an operation of a pixel in the sixth interval SC6 shown in FIG. 6.

Referring to FIGS. 4, 6, and 7, the write scan signal GWj may further include a second write activation interval WA2 overlapping a hold cycle interval. For example, the write scan signal GWj may further include the second write activation interval WA2 during a portion of the hold cycle interval.

A time between a ninth time point t9 at which the first write activation interval WA1 starts and a tenth time point t10 at which the first write activation interval WA1 ends may be 1 unit horizontal period (1H). A time between an eleventh time point t11 at which the second write activation interval WA2 starts and a twelfth time point t12 at which the second write activation interval WA2 ends may be 2 unit horizontal periods.

The first stage 310*s* (see FIG. 3) may output at least one of the first write clock signals CLK1-1 and CLK1*b*-1 (see FIG. 3) and the second write clock signals CLK2-1 and CLK2*b*-1 (see FIG. 3) as the write scan signal GWj. Accordingly, a time duration of the write scan signal GWj may be expanded by increasing a time duration of each of the first write clock signals CLK1-1 and CLK1*b*-1 and a time duration of each of the second write clock signals CLK2-1 and CLK2*b*-1. The time duration of each of the first write clock signals CLK1-1 and CLK1*b*-1 and the time duration of each of the second write clock signals CLK2-1 and CLK2*b*-1 may be 2 unit horizontal periods.

FIGS. 4 and 6 illustrate that the first write activation interval WA1 has 1 unit horizontal period and the second write activation interval WA2 has 2 unit horizontal periods, but is not particularly limited thereto. For example, the first write activation interval WA1 may be 1 unit horizontal period, and the second write activation interval WA2 may be 1 unit horizontal period; the first write activation interval WA1 may be 2 unit horizontal periods, and the second write activation interval WA2 may be 1 unit horizontal period; or, the first write activation interval WA1 may be 2 unit horizontal periods, and the second write activation interval WA2 may be 2 unit horizontal periods.

In the second write activation interval WA2 of the hold cycle interval, the anode of the display element ED may be initialized. The second write activation interval WA2 may be an interval in which the anode of the display element ED is secondarily initialized. When the seventh transistor T7 is turned on, the second initialization voltage VINT2 may be applied to the anode of the display element ED. Accordingly, the display element ED may be initialized.

According to an embodiment of the present disclosure, the transmission activation interval GDA, in which the transmission control signal GDj is activated, may not overlap the hold cycle interval. That is, in the hold cycle interval, the transmission control signal GDj may be at a low level. Accordingly, even when the second transistor T2, which is controlled by the same signal as the seventh transistor T7 in the hold cycle interval, is turned on, the third transistor T3 may be turned off. Accordingly, the data signal Di in the hold cycle interval may be blocked by the third transistor T3, and thus may not be delivered to the third node N3.

Figure 8:
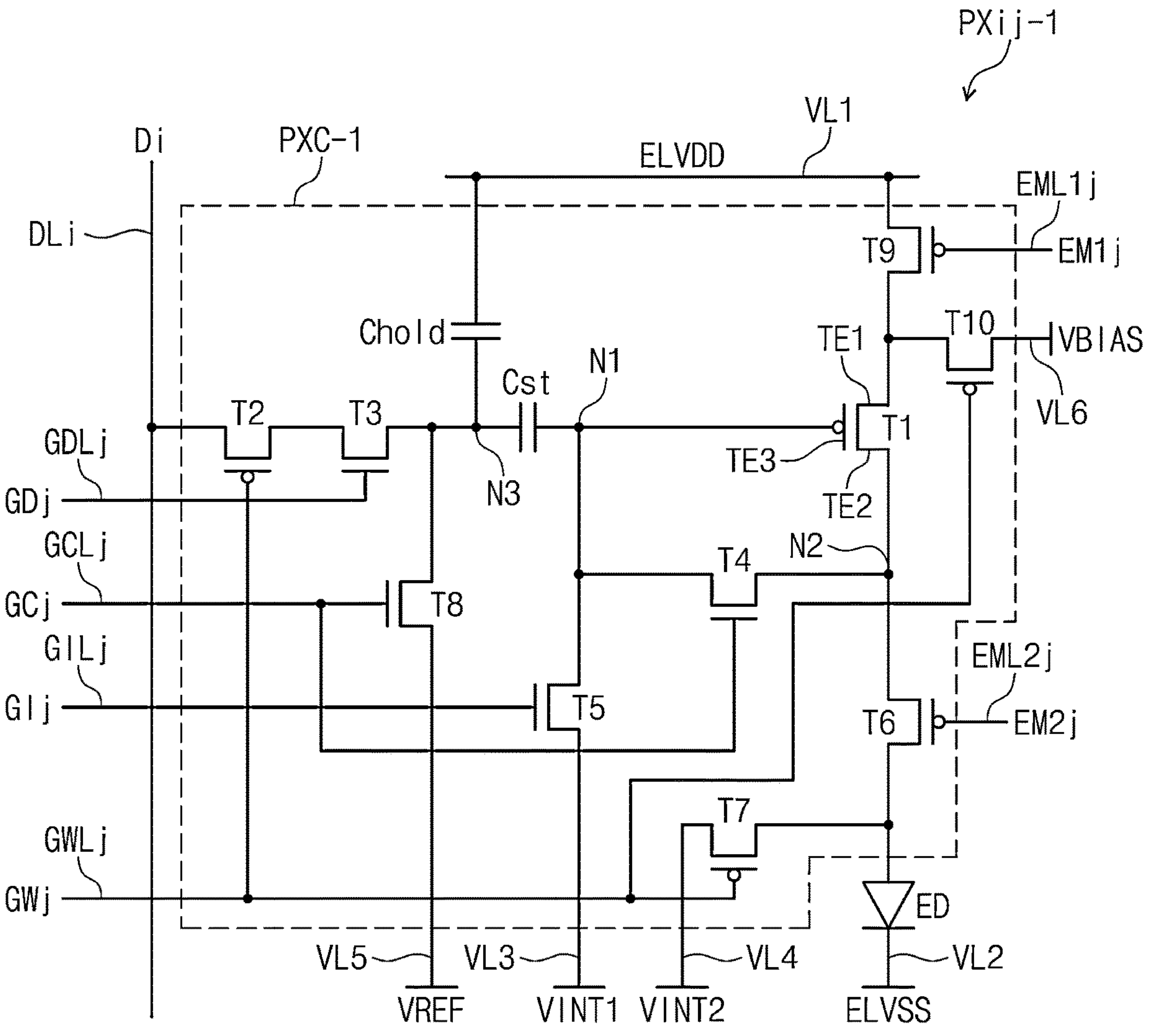
FIG. 8 is a circuit diagram of a pixel, according to an embodiment of the present disclosure.

FIG. 8 is a circuit diagram of a pixel PXij-1, according to an embodiment of the present disclosure. In the description of FIG. 8, the same reference numerals are assigned to the same components described with reference to FIG. 2, and thus the descriptions thereof are omitted to avoid redundancy.

Referring to FIG. 8, the pixel PXij-1 according to an embodiment includes a pixel circuit PXC-1 and at least one light emitting element ED. The pixel circuit PXC-1 may include first to tenth transistors T1, T2, T3, T4, T5, T6, T7, T8, T9, and T10, the first capacitor Cst, and the second capacitor Chold.

The ninth transistor T9 may be connected between the first electrode TE1 of the first transistor T1 and the first driving voltage line VL1.

An operation of the ninth transistor T9 may be controlled by a first emission control signal EMU provided to a j-th first emission control line EML1*j*. The ninth transistor T9 may be turned on in response to the first emission control signal EM1*j*. An operation of the sixth transistor T6 may be controlled by a second emission control signal EM2*j* provided to a j-th second emission control line EML2*j*. The sixth transistor T6 may be turned on in response to the second emission control signal EM2*j*.

The tenth transistor T10 may be connected between the first electrode TE1 of the first transistor T1 and a sixth driving voltage line VL6. A bias voltage VBIAS may be provided to the sixth driving voltage line VL6, and the sixth driving voltage line VL6 may be referred to as a "bias voltage line". An operation of the tenth transistor T10 may be controlled by the write scan signal GWj provided to the j-th write scan line GWLj.

Each of the ninth transistor T9 and the tenth transistor T10 may be a P-type thin film transistor having a silicon semiconductor layer (e.g., an LTPS semiconductor layer).

Figure 9:
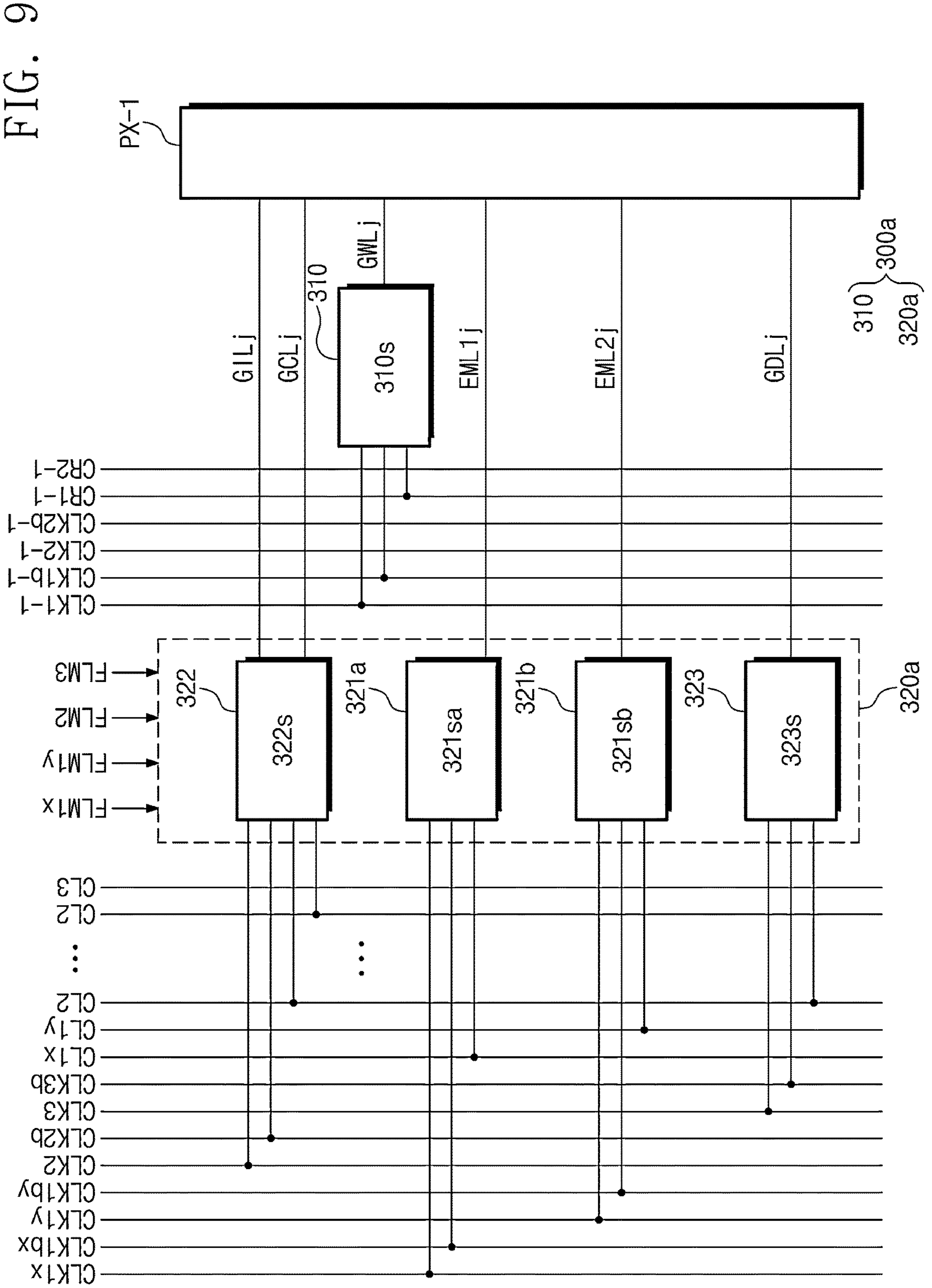
FIG. 9 is a block diagram illustrating a driving circuit and a pixel, according to another embodiment of the present disclosure.
Figure 10:
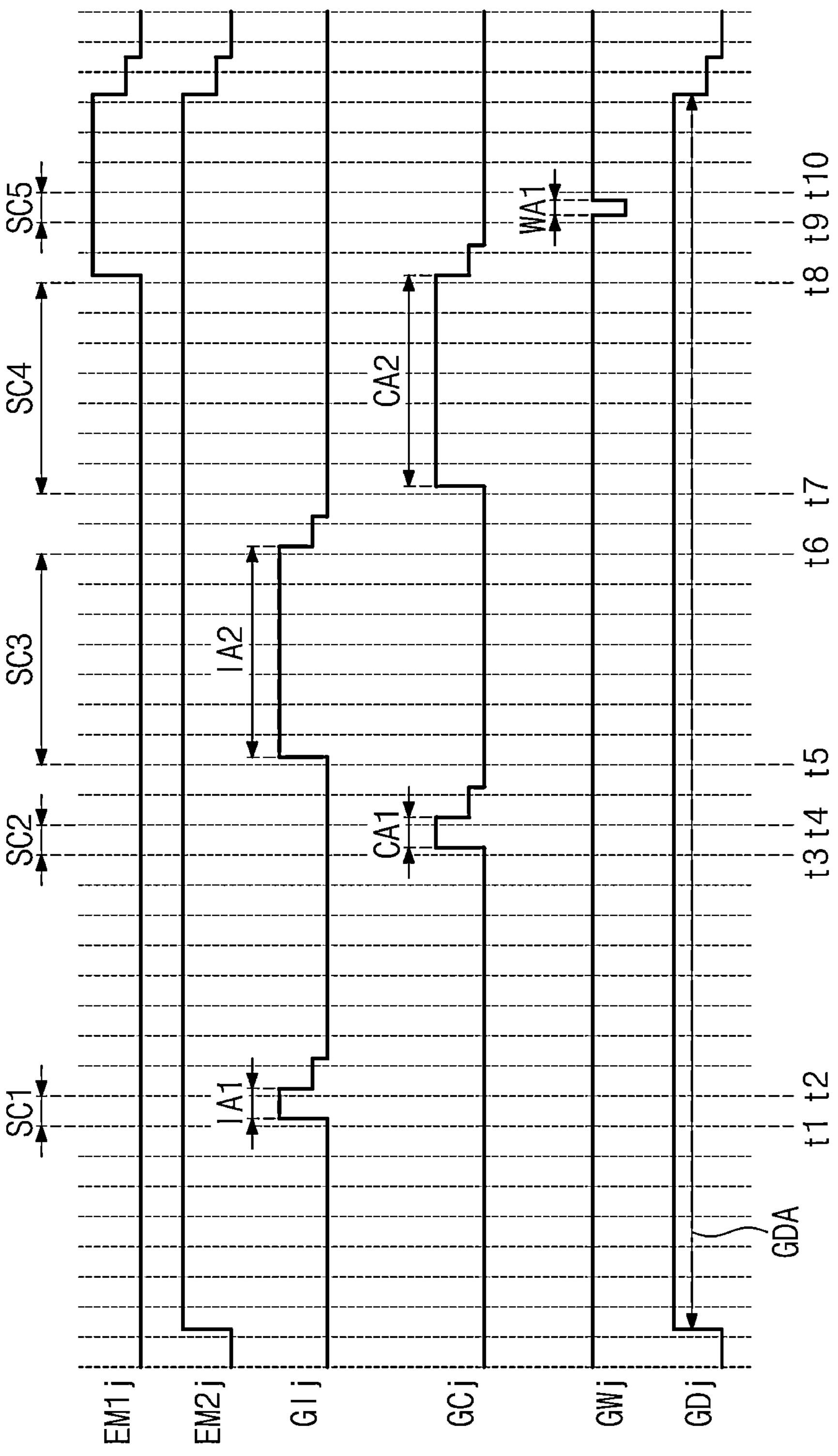
FIG. 10 is a timing diagram for describing an operation of a pixel in a write cycle interval, according to an embodiment of the present disclosure.

FIG. 9 is a block diagram illustrating a driving circuit 300*a* and a pixel PX-1, according to another embodiment of the present disclosure. FIG. 10 is a timing diagram for describing an operation of a pixel in a write cycle interval, according to an embodiment of the present disclosure. In the description of FIGS. 9 and 10, the same reference numerals are assigned to the same components described with reference to FIGS. 3 and 4, and thus the descriptions thereof are omitted to avoid redundancy.

Referring to FIGS. 9 and 10, each of the driving circuits 300*a* may include the first driving circuit 310 and a second driving circuit 320*a*. The second driving circuit 320*a* may include first sub-driving circuits 321*a* and 321*b*, the second sub-driving circuit 322, and the third sub-driving circuit 323. The first sub-driving circuits 321*a* and 321*b* may include a first emission control circuit 321*a* and a second emission control circuit 321*b*.

FIG. 9 shows the one first stage 310*s* of the first driving circuit 310 connected to a j-th row of pixels PX-1, a (2-1)-st stage 321*sa* of the first emission control circuit 321*a* connected to the j-th row of pixels PX-1, a (2-2)-nd stage 321*sb* of the second emission control circuit 321*b* connected to the j-th row of pixels PX-1, the one third stage 322*s* of the second sub-driving circuit 322 connected to the j-th row of pixels PX-1, and the one fourth stage 323*s* of the third sub-driving circuit 323 connected to the j-th row of pixels PX-1.

A (1-1)-st start signal FLM1*x*, a (1-2)-nd start signal FLM1*y*, the second start signal FLM2, and the third start signal FLM3 may be provided to first stages of the first emission control circuit 321*a*, the second emission control circuit 321*b*, the second sub-driving circuit 322, and the third sub-driving circuit 323, respectively.

The (2-1)-st stage 321*sa* may receive first clock signals CLK1*x* and CLK1*bx* and a first carry signal CL1*x* and may output the first emission control signal EM1*j* to the first emission control line EML1*j*.

The (2-2)-nd stage 321*sb* may receive first clock signals CLK1*y* and CLK1*by* and a first carry signal CL1*y* and may output the second emission control signal EM2*j* to the second emission control line EML2*j*.

Figure 11A:
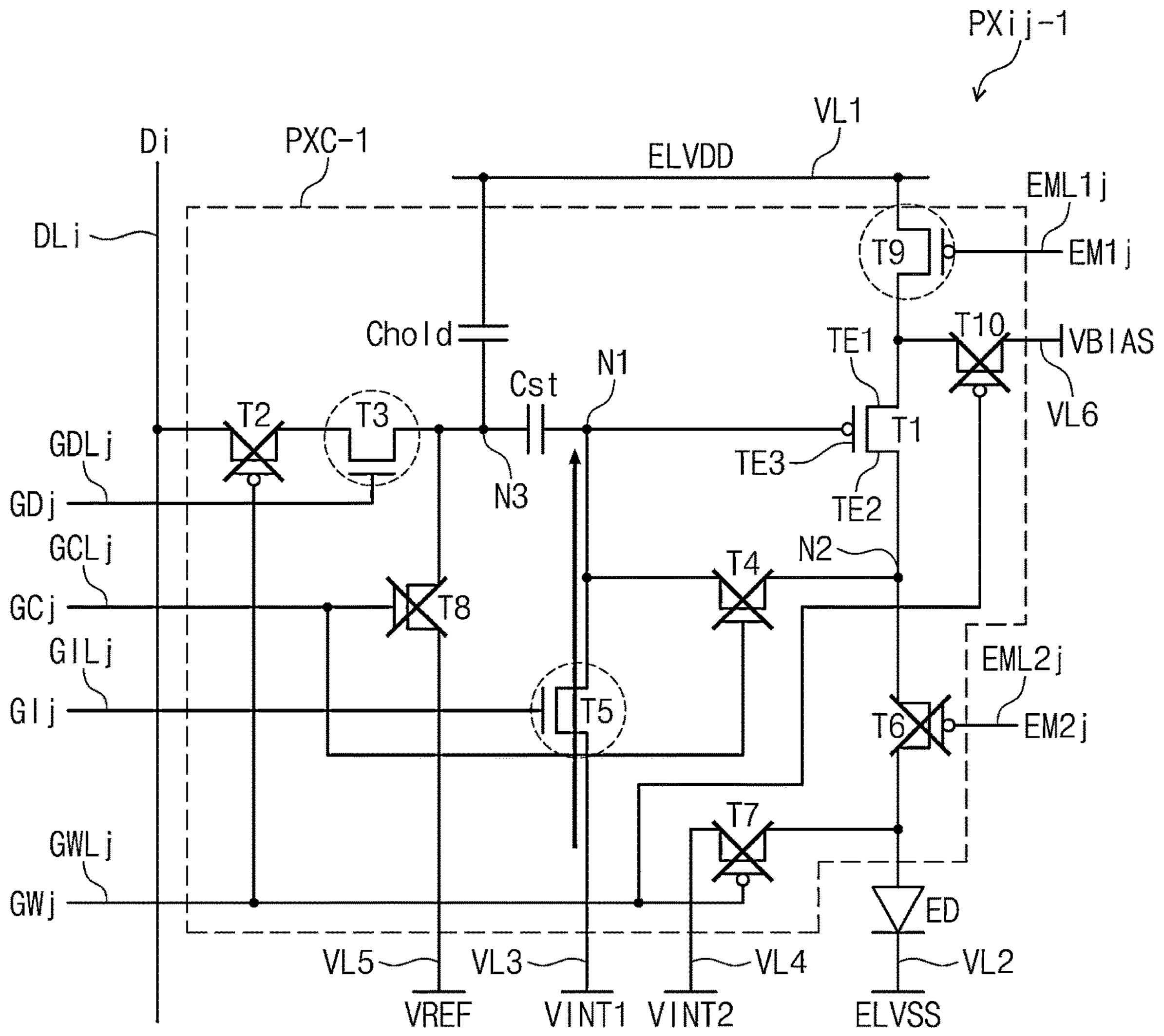
FIG. 11A is a diagram for describing an operation of a pixel in a first interval and a third interval shown in FIG. 10.
Figure 11B:
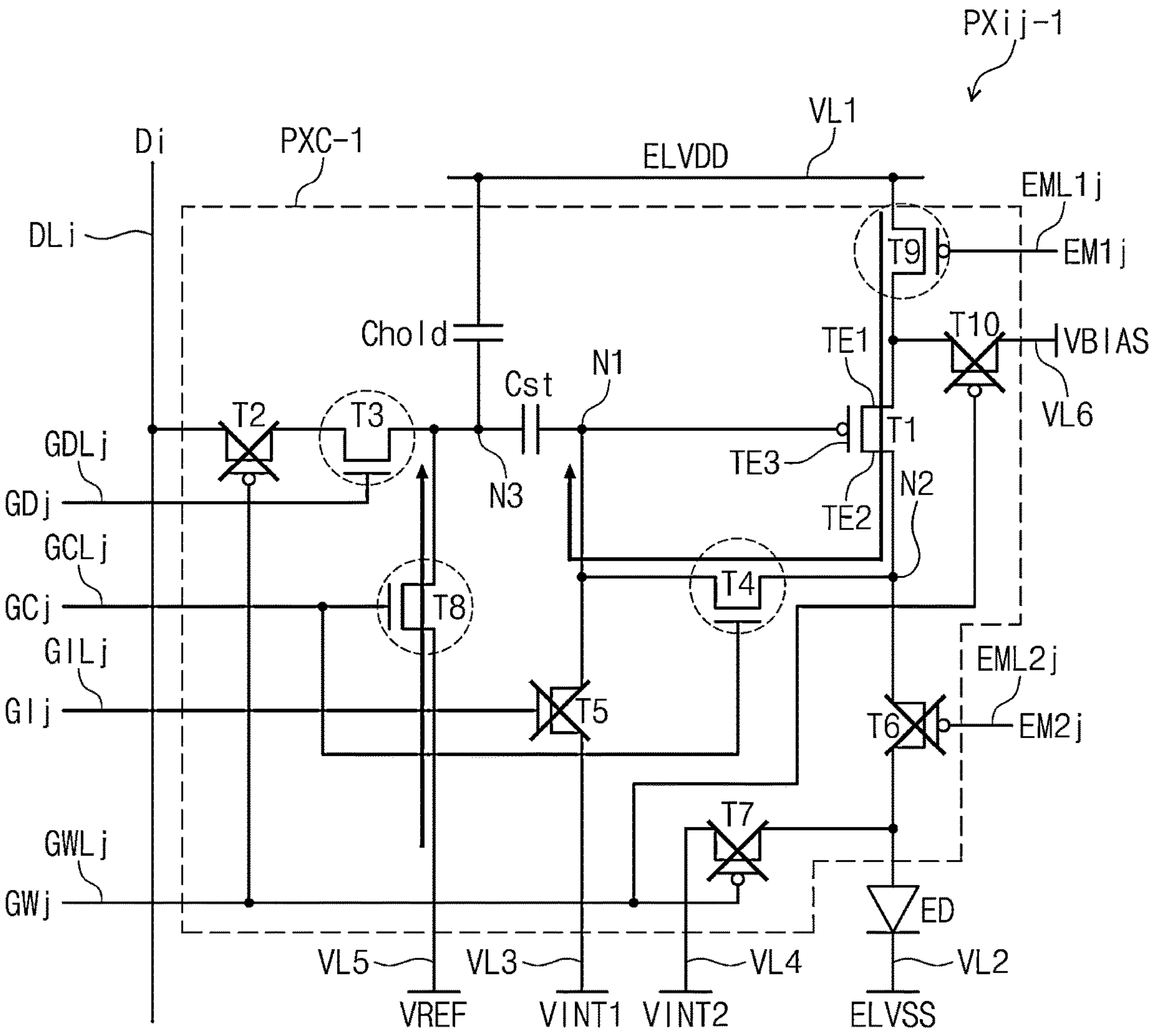
FIG. 11B is a diagram for describing an operation of a pixel in a second interval and a fourth interval shown in FIG. 10.
Figure 11C:
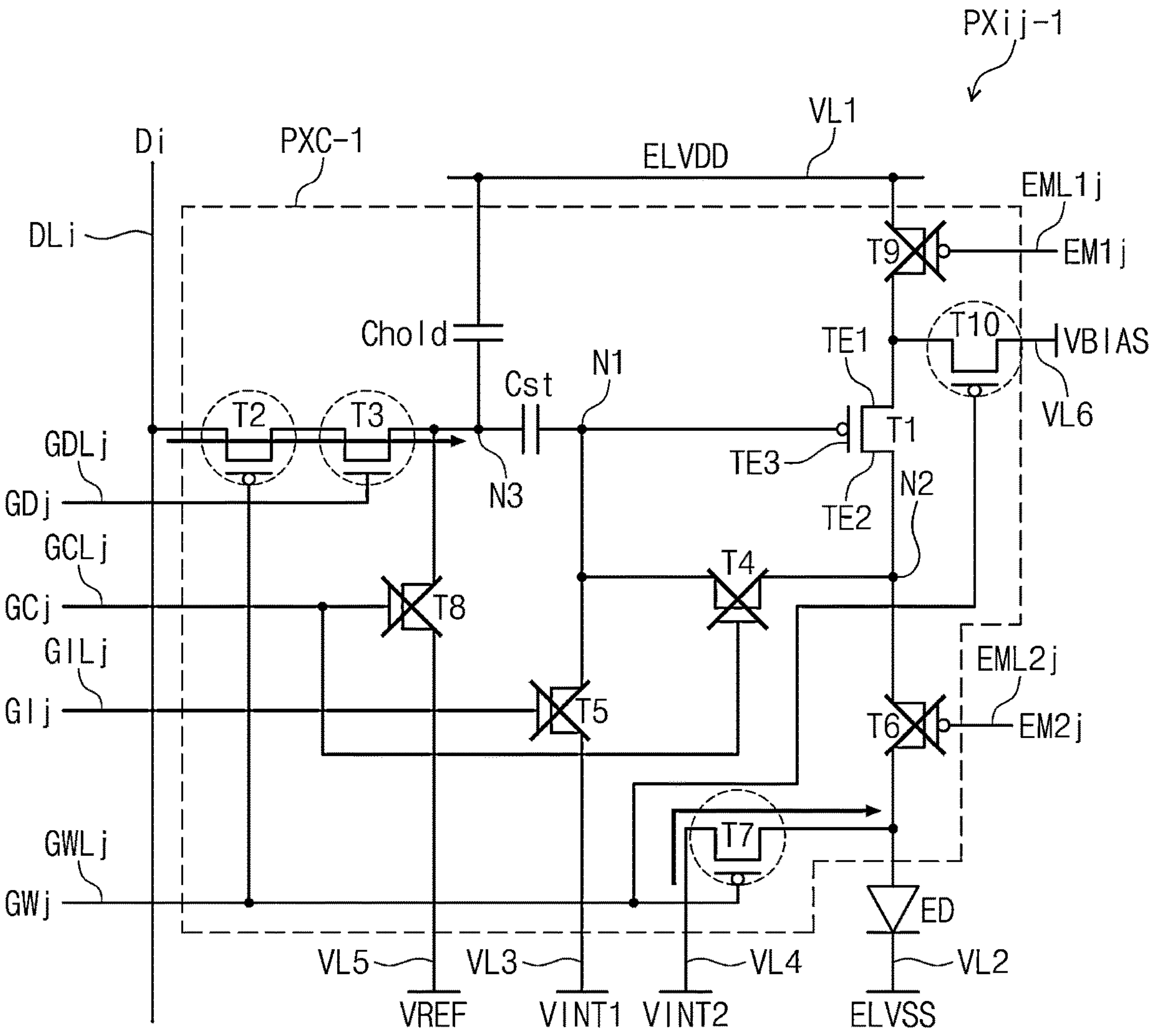
FIG. 11C is a diagram for describing an operation of a pixel in a fifth interval shown in FIG. 10.

FIG. 11A is a diagram for describing an operation of the pixel PXij-1 in the first interval SC1 and the third interval SC3 shown in FIG. 10. FIG. 11B is a diagram for describing an operation of the pixel PXij-1 in the second interval SC2 and the fourth interval SC4 shown in FIG. 10. FIG. 11C is a diagram for describing an operation of the pixel PXij-1 in the fifth interval SC5 shown in FIG. 10. In the description of FIGS. 11A, 11B, and 11C, the same reference numerals are assigned to the same components described with reference to FIGS. 5A, 5B, and 5C, and thus the descriptions thereof are omitted to avoid redundancy.

Referring to FIGS. 10, 11A, 11B, and 11C, the first emission control signal EM1*j* may have an active level (e.g., a low level) in the first interval SC1, the second interval SC2, the third interval SC3, and the fourth interval SC4. Accordingly, in the first interval SC1, the second interval SC2, the third interval SC3, and the fourth interval SC4, the ninth transistor T9 may be turned on. The first emission control signal EM1*j* may have an inactive level (e.g., a high level) in the fifth interval SC5. Accordingly, in the fifth interval SC5, the ninth transistor T9 may be turned off.

The second emission control signal EM2*j* may have an inactive level (e.g., a high level) in the first to fifth intervals SC1, SC2, SC3, SC4, and SC5. Accordingly, in the first to fifth intervals SC1, SC2, SC3, SC4, and SC5, the sixth transistor T6 may be turned off.

Referring to FIG. 11C, in the fifth interval SC5, the second initialization voltage VINT2 may be applied to an anode of the display element ED, and the bias voltage VBIAS may be applied to the first electrode TE1 of the first transistor T1.

Figure 12:
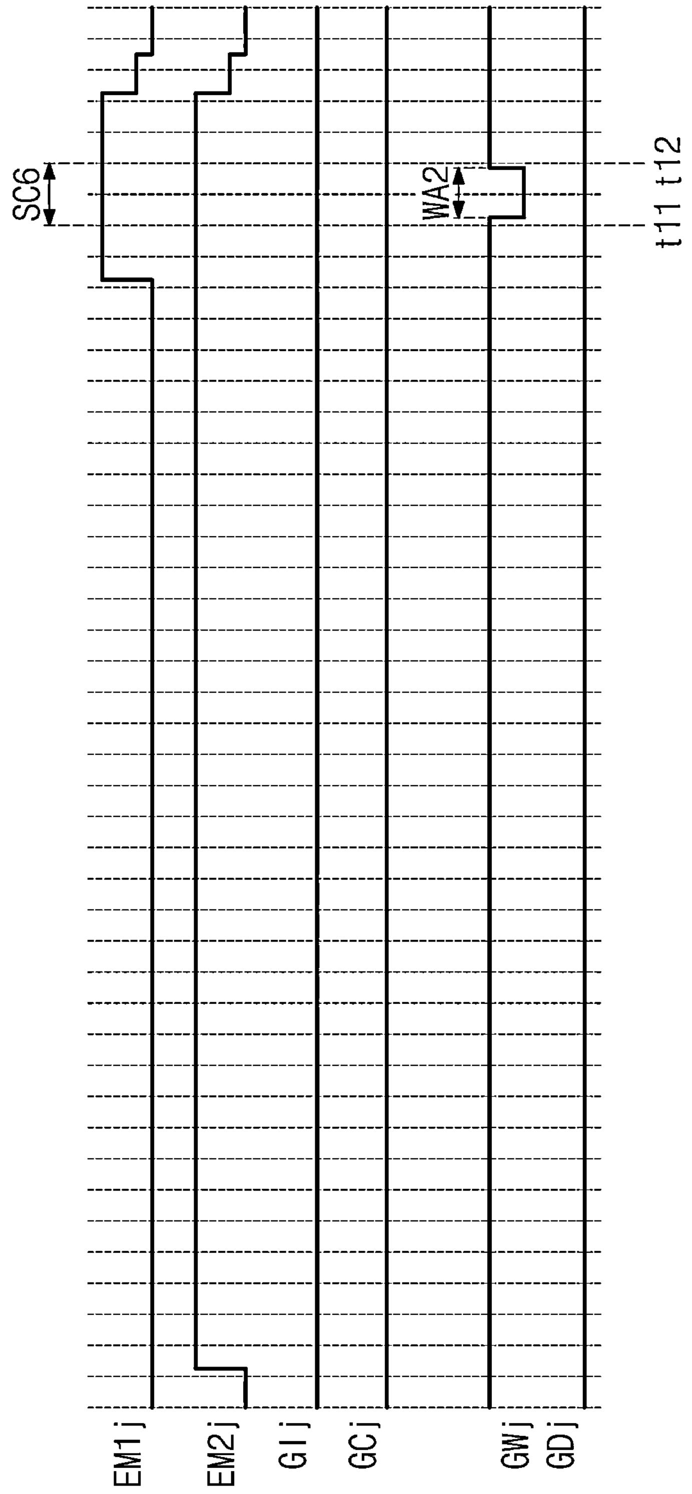
FIG. 12 is a timing diagram for describing an operation of a pixel in a hold cycle interval, according to an embodiment of the present disclosure.
Figure 13:
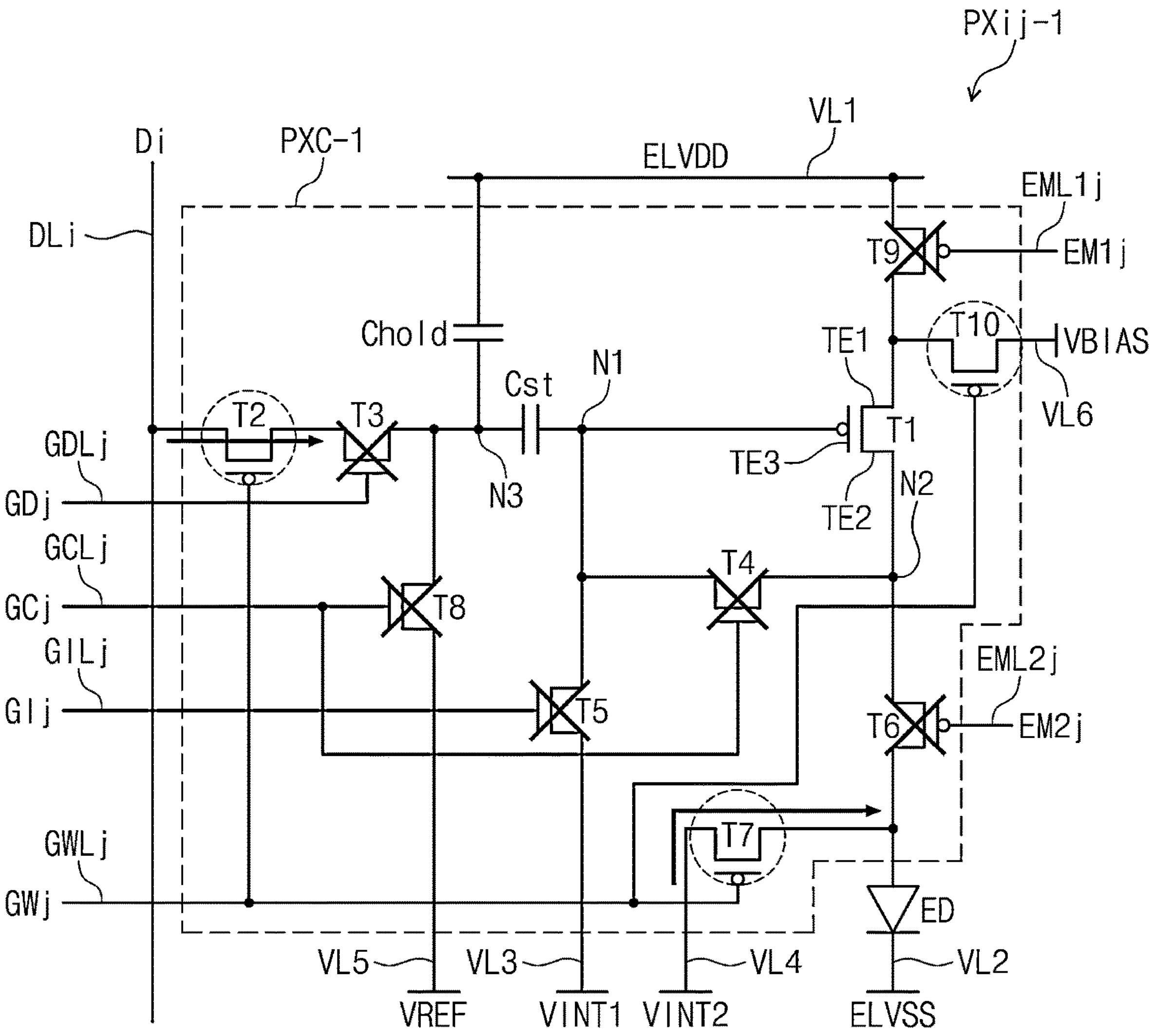
FIG. 13 is a diagram for describing an operation of a pixel in the sixth interval shown in FIG. 12.

FIG. 12 is a timing diagram for describing an operation of a pixel in a hold cycle interval, according to an embodiment of the present disclosure. FIG. 13 is a diagram for describing an operation of a pixel in the sixth interval shown in FIG. 12. In the description of FIGS. 12 and 13, the same reference numerals are assigned to the same components described with reference to FIGS. 6 and 7, and thus the descriptions thereof are omitted to avoid redundancy.

Referring to FIGS. 10, 12, and 13, in the sixth interval SC6 of a hold cycle interval, an anode of the display element ED may be initialized. When the seventh transistor T7 is turned on, the second initialization voltage VINT2 may be applied to the anode of the display element ED. Accordingly, the display element ED may be initialized.

According to an embodiment of the present disclosure, the transmission activation interval GDA, in which the transmission control signal GDj is activated, may not overlap the hold cycle interval. Accordingly, even when the second transistor T2, which is controlled by the same signal as the seventh transistor T7 in the hold cycle interval, is turned on, the third transistor T3 may be turned off. Accordingly, the data signal Di in the hold cycle interval may be blocked by the third transistor T3, and thus may not be delivered to the third node N3.

Moreover, each of the first and second emission control signals EM1*j* and EM2*j* may have an inactive level (e.g., a high level) in the sixth interval SC6. Accordingly, in the fifth interval SC6, the sixth transistor T6 and the ninth transistor T9 may be turned off.

Figure 14:
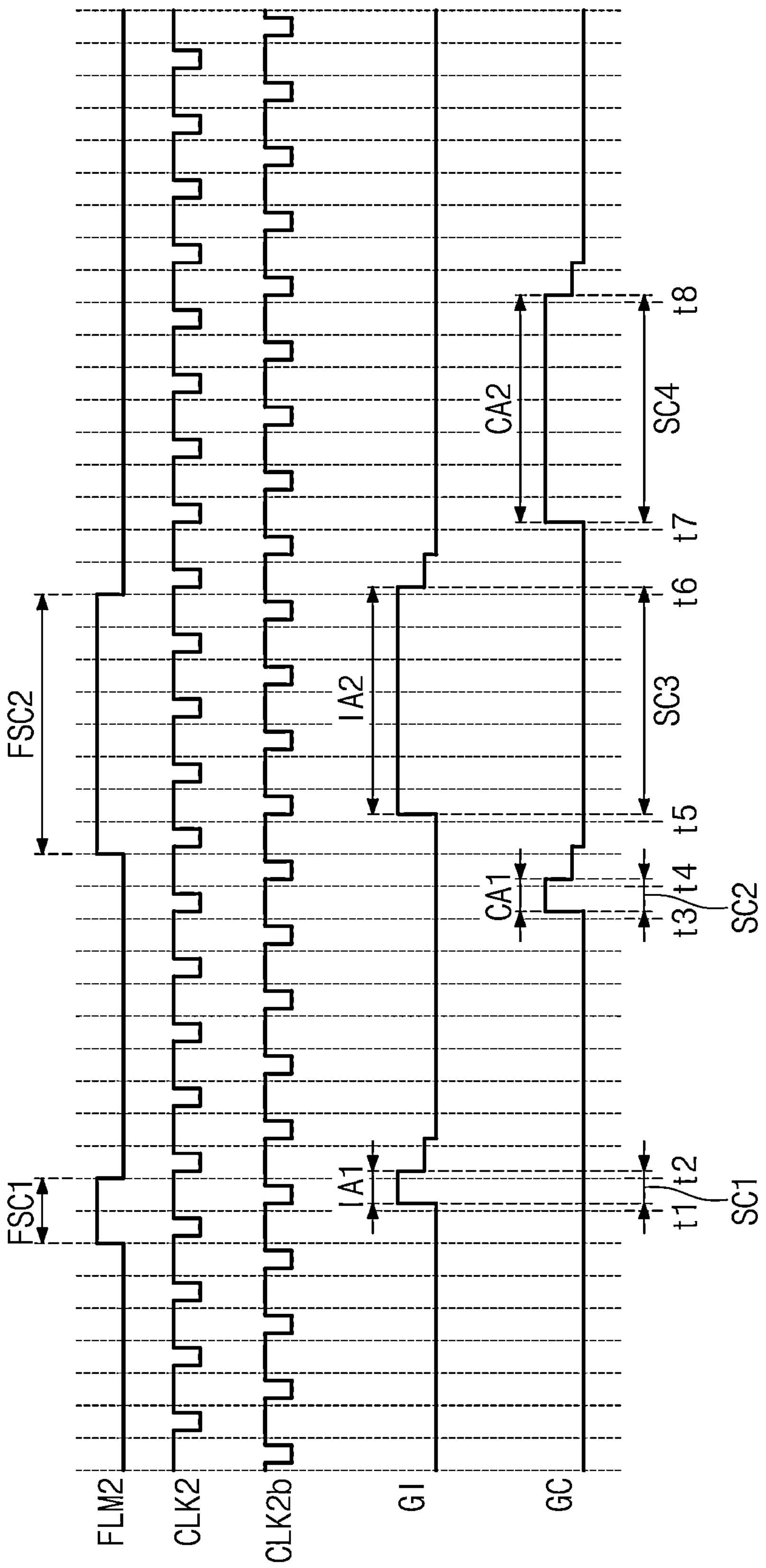
FIG. 14 is a timing diagram illustrating signals provided to a second sub-driving circuit and signals output from a second sub-driving circuit in a write cycle interval, according to an embodiment of the present disclosure.

FIG. 14 is a timing diagram illustrating signals provided to the second sub-driving circuit 322 (see FIG. 3 or 9) and signals output from the second sub-driving circuit 322 in a write cycle interval, according to an embodiment of the present disclosure.

FIG. 14 shows waveforms of the second start signal FLM2, the second clock signals CLK2 and CLK2*b*, an initialization scan signal GI, and a compensation scan signal GC.

The waveform of the second start signal FLM2 may be changed to control waveforms of the initialization scan signal GI and the compensation scan signal GC. For example, the second start signal FLM2 may include a first interval FSC1 and a second interval FSC2, each of which has a high level.

A time duration of the first interval FSC1 may be different from a time duration of the second interval FSC2. The time duration of the first interval FSC1 may be smaller than the time duration of the second interval FSC2. Accordingly, to correspond to a difference between the time duration of the first interval FSC1 and the time duration of the second interval FSC2, a time duration of the first initialization activation interval IA1 may be smaller than a time duration of the second initialization activation interval IA2, and a time duration of the first compensation activation interval CA1 may be smaller than a time duration of the second compensation activation interval CA2.

Unlike an embodiment of the present disclosure, when the time duration of the second compensation activation interval CA2 of the compensation scan signal GC is increased to 7 unit horizontal periods in the case where the initialization scan signal GI and the compensation scan signal GC are output as clock signals, both the time duration of the first initialization activation interval IA1 and the time duration of the second initialization activation interval IA2 may be 7 unit horizontal periods correspondingly. Accordingly, a length of the entire initialization interval in a write cycle interval may be 14 unit horizontal periods. In this case, a difference in luminance may occur due to a difference in initialization bias between a hold cycle interval not including an initialization interval and a write cycle interval including the initialization interval. For example, at a low grayscale, an optical waveform in the write cycle interval is lower than the optical waveform in the hold cycle interval, and thus a difference in luminance may occur.

According to an embodiment of the present disclosure, even when the time duration of the second compensation activation interval CA2 of the compensation scan signal GC is increased to 7 unit horizontal periods, the time duration of the first interval SC1 may not be increased by adjusting the waveform of the second start signal FLM2. In other words, even when the time duration of the second compensation activation interval CA2 is 7 unit horizontal periods, the time duration of the first compensation activation interval CA1 and the time duration of the first initialization activation interval IA1 may not increase together. Accordingly, a length of the entire initialization interval in the write cycle interval may be 8 unit horizontal periods. According to an embodiment of the present disclosure, even when the time duration of the second compensation activation interval CA2 is increased, a difference in initialization bias between the hold cycle interval not including the initialization interval and the write cycle interval including the initialization interval may be reduced. For example, at a low grayscale, a difference between an optical waveform in the write cycle interval and an optical waveform in the hold cycle interval may be reduced, and thus a difference in luminance may occur.

Figure 15:
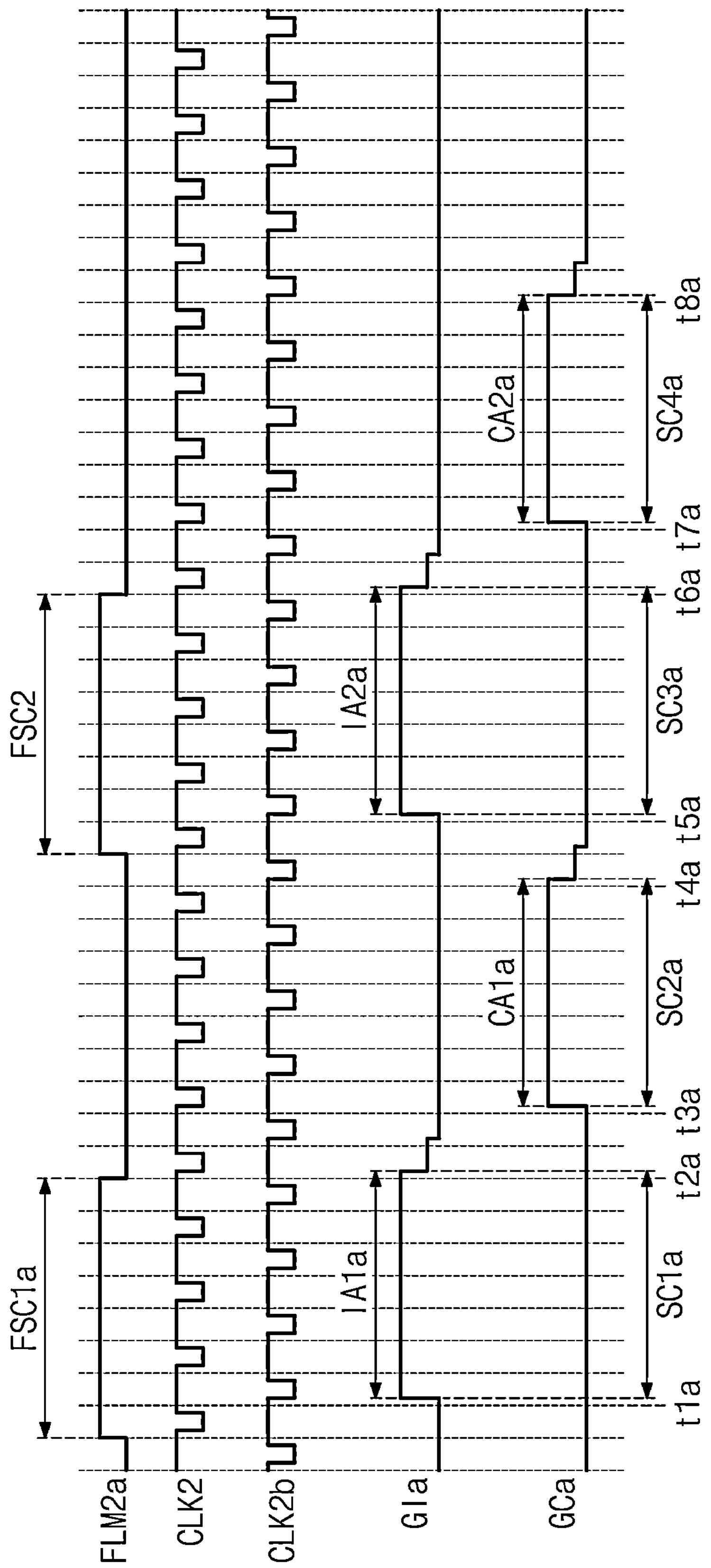
FIG. 15 is a timing diagram illustrating signals provided to a second sub-driving circuit and signals output from a second sub-driving circuit in a write cycle interval, according to an embodiment of the present disclosure.

FIG. 15 is a timing diagram illustrating signals provided to the second sub-driving circuit 322 (see FIG. 3 or 9) and signals output from the second sub-driving circuit 322 in a write cycle interval, according to an embodiment of the present disclosure.

FIG. 15 shows waveforms of a second start signal FLM2*a*, the second clock signals CLK2 and CLK2*b*, an initialization scan signal GIa, and a compensation scan signal GCa in a first interval SC1*a*, a second interval SC2*a*, a third interval SC3*a*, and a fourth interval SC4*a*, which are included in a write cycle interval. The first interval SC1*a* may be referred to as a "first initialization interval"; the second interval SC2*a* may be referred to as a "reference voltage write interval"; the third interval SC3*a* may be referred to as a "second initialization interval"; and, the fourth interval SC4*a* may be referred to as a "compensation interval".

According to an embodiment of the present disclosure, the waveform of the second start signal FLM2*a* may be changed to control waveforms of the initialization scan signal GIa and the compensation scan signal GCa. For example, the second start signal FLM2*a* may include a first interval FSC1*a* and a second interval FSC2, each of which has a high level. The time duration of the first interval FSC1*a* may be the same as the time duration of the second interval FSC2. That is, the time duration of the first interval FSC1*a* may be variously modified within a range smaller than the time duration of the second interval FSC2.

Referring to FIG. 15, each of a first initialization activation interval IA1*a*, a second initialization activation interval IA2*a*, a first compensation activation interval CA1*a*, and a second compensation activation interval CA2 may be 2 unit horizontal periods or more. For example, a time between a first time point t1*a* at which the first initialization activation interval IA1*a* starts and a second time point t2*a* at which the first initialization activation interval IA1*a* ends may be 7 unit horizontal periods. A time between a third time point t3*a* at which the first compensation activation interval CA1*a* starts and a fourth time point t4*a* at which the first compensation activation interval CA1*a* ends may be 7 unit horizontal periods. A time between a fifth time point t5*a* at which the second initialization activation interval IA2*a* starts and a sixth time point t6*a* at which the second initialization activation interval IA2*a* ends may be 7 unit horizontal periods. A time between a seventh time point t7*a* at which the second compensation activation interval CA2*a* starts and an eighth time point t8*a* at which the second compensation activation interval CA2*a* ends may be 7 unit horizontal periods.

Figure 16:
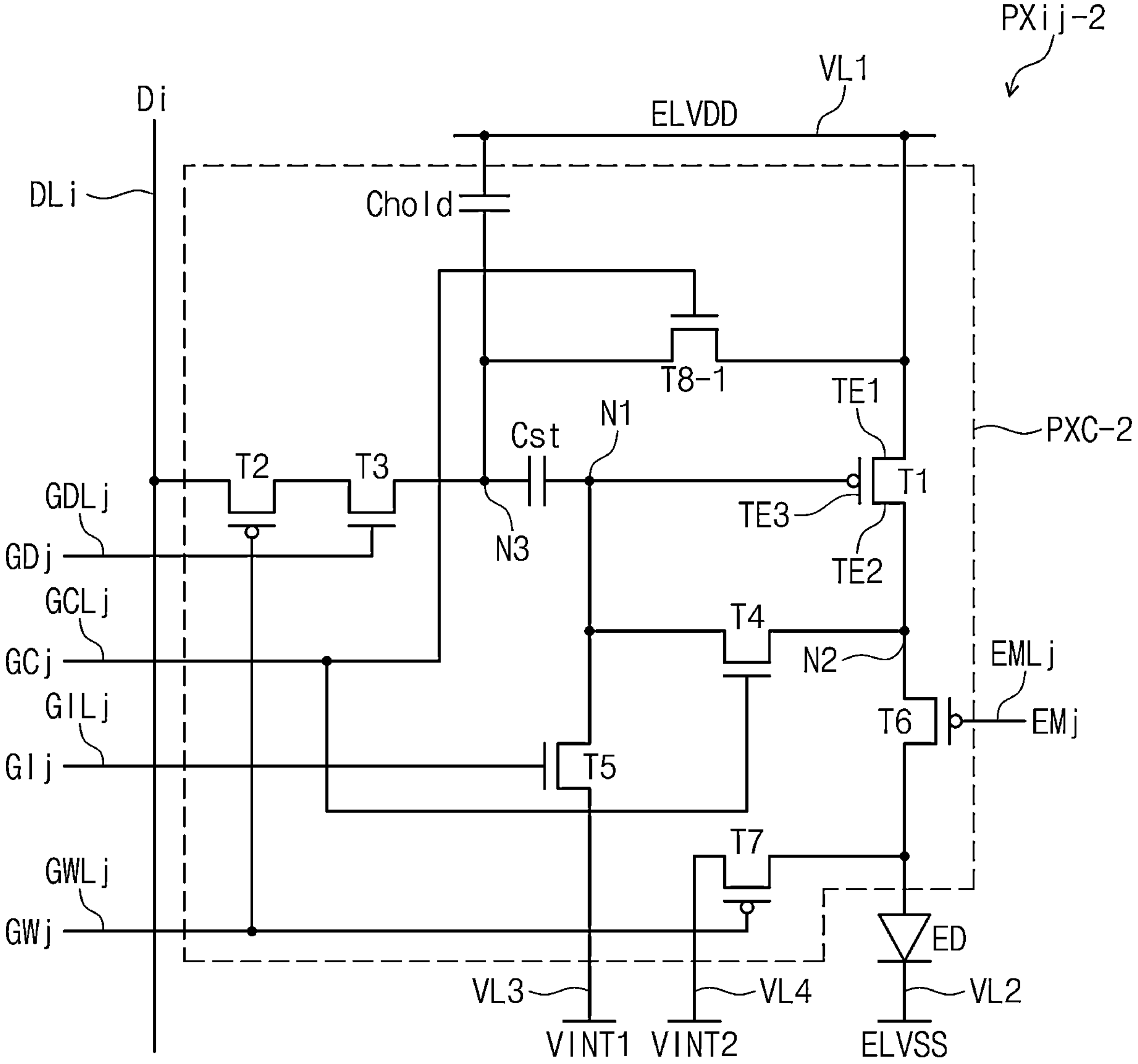
FIG. 16 is a circuit diagram of a pixel, according to an embodiment of the present disclosure.

FIG. 16 is a circuit diagram of a pixel PXij-2, according to an embodiment of the present disclosure. In the description of FIG. 16, the same reference numerals are assigned to the same components described with reference to FIG. 2, and thus the descriptions thereof are omitted to avoid redundancy.

Referring to FIG. 16, the pixel PXij-2 according to an embodiment includes a pixel circuit PXC-2 and at least one light emitting element ED. The pixel circuit PXC-2 may include first to eighth transistors T1, T2, T3, T4, T5, T6, T7, and T8-1, the first capacitor Cst, and the second capacitor Chold. The pixel PXij-2 shown in FIG. 16 may operate in substantially the same manner as the operation described with reference to FIGS. 3, 4, 5A to 5C, 6, 7, 14, and 15.

The eighth transistor T8-1 may be connected between the first electrode TE1 of the first transistor T1 and the third node N3. An operation of the eighth transistor T8-1 may be controlled by the compensation scan signal GCj provided to the j-th compensation scan line GCLj.

Figure 17:
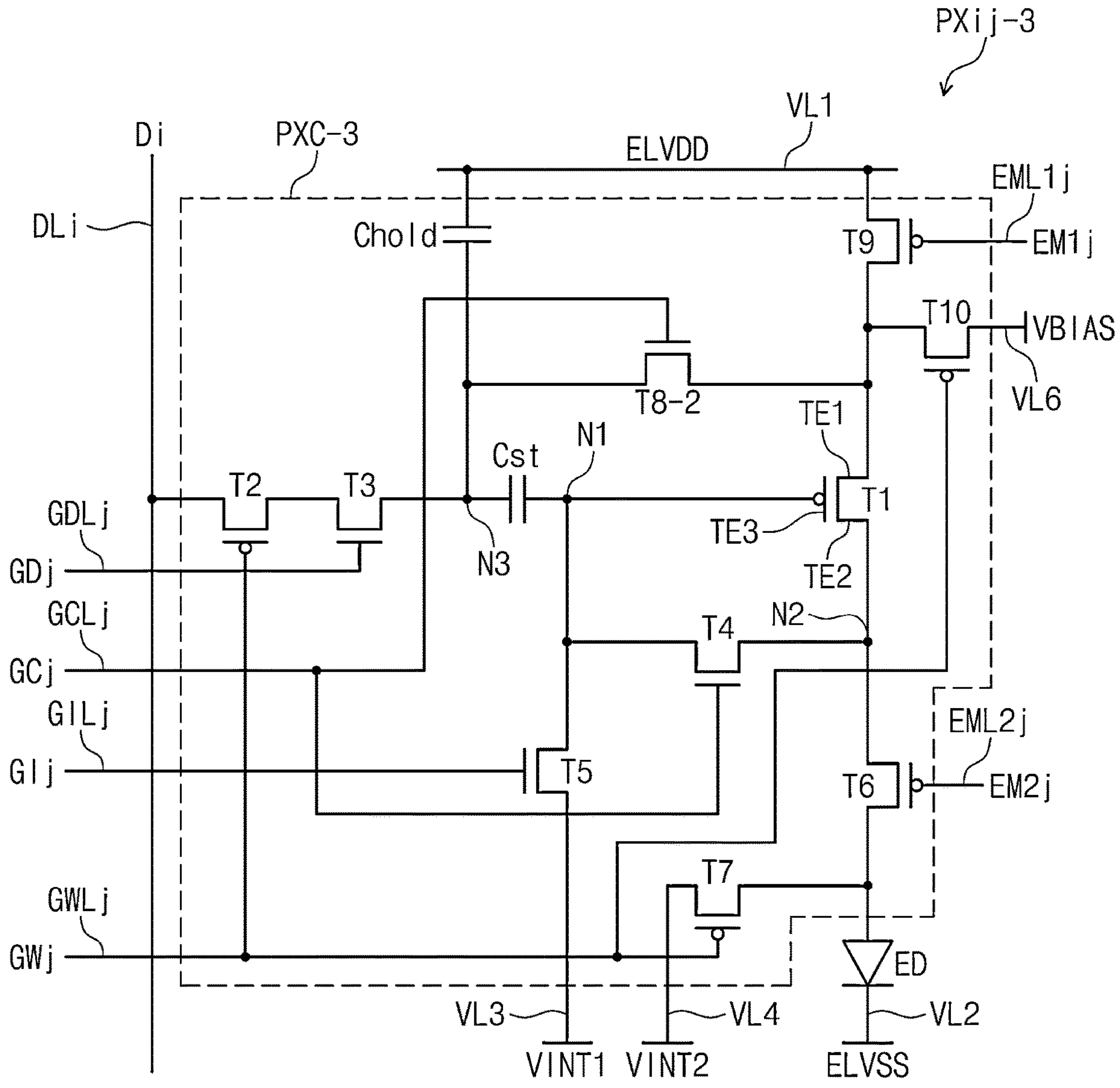
FIG. 17 is a circuit diagram of a pixel, according to an embodiment of the present disclosure.

FIG. 17 is a circuit diagram of a pixel PXij-3, according to an embodiment of the present disclosure. In the description of FIG. 17, the same reference numerals are assigned to the same components described with reference to FIGS. 2 and 8, and thus the descriptions thereof are omitted to avoid redundancy.

Referring to FIG. 17, the pixel PXij-3 according to an embodiment includes a pixel circuit PXC-3 and at least one light emitting element ED. The pixel circuit PXC-3 may include first to tenth transistors T1, T2, T3, T4, T5, T6, T7, T8-2, T9, and T10, the first capacitor Cst, and the second capacitor Chold. The pixel PXij-3 shown in FIG. 17 may operate in substantially the same manner as the operation described with reference to FIGS. 9, 10, 11A to 11C, 12, 13, 14, and 15.

The eighth transistor T8-2 may be connected between the first electrode TE1 of the first transistor T1 and the third node N3. An operation of the eighth transistor T8-2 may be controlled by the compensation scan signal GCj provided to the j-th compensation scan line GCLj.

In a case of each of the pixel PXij-2 shown in FIG. 16 and the pixel PXij-3 shown in FIG. 17, circuit portions separated by the first capacitor Cst may be electrically connected to each other by the eighth transistor T8-1 or T8-2. For example, the second transistor T2 and the first transistor T1 may be electrically connected to each other by the eighth transistor T8-1 or T8-2. Accordingly, the eighth transistor T8-1 or T8-2 may be used as a path for testing a pixel array. For example, the second transistor T2, the third transistor T3, the eighth transistor T8-1 or T8-2, the first transistor T1, and the fourth transistor T4 may provide a path for testing a pixel array. Accordingly, after a test voltage is applied to the data line DLi, it is possible to check whether a defect occurs by checking a voltage change of the gate electrode TE3 of the first transistor T1.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, each of an initialization scan signal and a compensation scan signal may have an activation interval of 2 unit horizontal periods or more. Accordingly, as a compensation time is sufficiently secured even when one unit horizontal period is reduced by restriction driving, display quality may be improved. Each of the initialization scan signal and the compensation scan signal may be provided by a driving circuit that receives clock signals having a time duration of 1 unit horizontal period and outputs a predetermined voltage. Accordingly, because there is no need to add time durations of clock signals and the number of clock signals corresponding to the initialization scan signal and compensation scan signal even though each of the initialization scan signal and compensation scan signal has an activation interval of 2 unit horizontal periods or more, a time duration of a dead space may not be increased.

Moreover, in a write cycle interval, the initialization scan signal may have a first initialization activation interval and a second initialization activation interval, and the compensation scan signal may have a first compensation activation interval and a second compensation activation interval. Even when a length of the second compensation activation interval is increased to secure a compensation time, a length of the first initialization activation interval may not increase proportionally. Accordingly, an initialization bias difference between a hold cycle interval not including an initialization interval and the write cycle interval including the initialization interval is reduced, and thus a difference in luminance between the write cycle interval and the hold cycle interval may be reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a pixel electrically connected to a data line, a write scan line, an initialization scan line, a compensation scan line, a transmission control line, and an emission control line and including a pixel circuit and a display element;

a first driving circuit configured to provide a write scan signal to the write scan line; and a second driving circuit configured to:

receive a plurality of clock signals, each of which has a time duration of one unit horizontal period, and provide an initialization scan signal, a compensation scan signal, a transmission control signal, and an emission control signal to the initialization scan line, the compensation scan line, the transmission control line, and the emission control line, respectively, wherein each of the initialization scan signal and the compensation scan signal has an activation interval of two unit horizontal periods or more, wherein the pixel circuit includes:

a first transistor including a gate electrode connected to a first node, a first electrode, and a second electrode connected to a second node;

a second transistor connected to the data line, an operation of the second transistor being controlled by the write scan signal provided to the write scan line; and a third transistor connected between the second transistor and a third node, an operation of the third transistor being controlled by the transmission control signal provided to the transmission control line and different from the write scan signal.

2. The display device of claim 1, wherein the initialization scan signal includes a first initialization activation interval having a first horizontal period and a second initialization activation interval having a second horizontal period greater than or equal to the first horizontal period, and wherein the compensation scan signal includes a first compensation activation interval having a third horizontal period and a second compensation activation interval having a fourth horizontal period greater than or equal to the third horizontal period.

3. The display device of claim 2, wherein each of the first horizontal period and the third horizontal period has a time duration of one unit horizontal period, and each of the second horizontal period and the fourth horizontal period has a time duration of two unit horizontal periods or more.

4. The display device of claim 2, wherein each of the first horizontal period, the second horizontal period, the third horizontal period, and the fourth horizontal period has a time duration of two unit horizontal periods or more.

5. The display device of claim 1, wherein the pixel circuit further includes:

a first capacitor connected between the first node and the third node; and a second capacitor connected between the third node and a driving voltage line.

6. The display device of claim 5, wherein the pixel circuit further includes:

a fourth transistor connected between the first node and the second node, an operation of the fourth transistor being controlled by the compensation scan signal provided to the compensation scan line;

a fifth transistor connected between the first node and a first initialization voltage line, an operation of the fifth transistor being controlled by the initialization scan signal provided to the initialization scan line;

a sixth transistor connected between the second node and the display element, an operation of the sixth transistor being controlled by the emission control signal provided to the emission control line; and a seventh transistor connected between the display element and a second initialization voltage line, an operation of the seventh transistor being controlled by the write scan signal provided to the write scan line.

7. The display device of claim 6, wherein the pixel circuit further includes:

an eighth transistor connected between the third node and a reference voltage line, an operation of the eighth transistor being controlled by the compensation scan signal provided to the compensation scan line, wherein each of the first transistor, the second transistor, the sixth transistor, and the seventh transistor is a P-type thin film transistor having a silicon semiconductor layer, and wherein each of the third transistor, the fourth transistor, the fifth transistor, and the eighth transistor is an N-type thin film transistor having an oxide semiconductor layer.

8. The display device of claim 7, wherein the pixel circuit further includes:

a ninth transistor connected between the first electrode of the first transistor and the driving voltage line; and a tenth transistor connected between the first electrode of the first transistor and a bias voltage line, an operation of the tenth transistor being controlled by the write scan signal provided to the write scan line, and wherein each of the ninth transistor and the tenth transistor is the P-type thin film transistor having the silicon semiconductor layer.

9. The display device of claim 6, wherein the pixel circuit further includes:

an eighth transistor connected between the first electrode of the first transistor and the third node, an operation of the eighth transistor being controlled by the compensation scan signal provided to the compensation scan line.

10. The display device of claim 5, wherein the pixel circuit is configured to operate in a write cycle interval and a hold cycle interval, wherein, in the write cycle interval, a data signal provided through the data line is delivered to the pixel circuit, and wherein, in the hold cycle interval, an anode of the display element is initialized.

11. The display device of claim 10, wherein the write scan signal includes a first write activation interval overlapping the write cycle interval and a second write activation interval overlapping the hold cycle interval, and wherein the data signal is delivered to the pixel in the first write activation interval, and the anode of the display element is initialized in the second write activation interval.

12. The display device of claim 11, wherein each of the first write activation interval and the second write activation interval is one unit horizontal period or more.

13. The display device of claim 11, wherein a length of the first write activation interval is different from a length of the second write activation interval.

14. The display device of claim 11, wherein the transmission control signal includes a transmission activation interval, and the transmission activation interval overlaps the first write activation interval.

15. The display device of claim 14, wherein the transmission activation interval of the transmission control signal does not overlap the hold cycle interval.

16. The display device of claim 1, wherein the second driving circuit includes:

a first sub-driving circuit configured to receive first clock signals and to output the emission control signal;

a second sub-driving circuit configured to receive second clock signals and to output the initialization scan signal and the compensation scan signal; and a third sub-driving circuit configured to receive third clock signals and to output the transmission control signal, wherein a time duration of each of the first clock signals is one unit horizontal period, wherein a time duration of each of the second clock signals is one unit horizontal period, and wherein a time duration of each of the third clock signals is one unit horizontal period.

17. A display device comprising:

a pixel electrically connected to a data line, a write scan line, an initialization scan line, a compensation scan line, a transmission control line, and an emission control line and including a pixel circuit and a display element; and a driving circuit configured to provide a write scan signal, an initialization scan signal, a compensation scan signal, a transmission control signal, and an emission control signal to the write scan line, the initialization scan line, the compensation scan line, the transmission control line, and the emission control line, respectively, wherein the initialization scan signal includes a first initialization activation interval having a first horizontal period and a second initialization activation interval having a second horizontal period greater than or equal to the first horizontal period, wherein the compensation scan signal includes a first compensation activation interval having a third horizontal period and a second compensation activation interval having a fourth horizontal period greater than or equal to the third horizontal period, and wherein each of the second horizontal period and the fourth horizontal period has a time duration of two unit horizontal periods or more.

18. The display device of claim 17, wherein the driving circuit includes:

a first sub-driving circuit configured to receive first clock signals and to output the emission control signal;

a second sub-driving circuit configured to receive second clock signals and to output the initialization scan signal and the compensation scan signal;

a third sub-driving circuit configured to receive third clock signals and to output the transmission control signal; and a scan driving circuit configured to receive fourth clock signals and to output the write scan signal.

19. The display device of claim 17, wherein the pixel circuit is configured to operate in a write cycle interval and a hold cycle interval, wherein the write scan signal includes a first write activation interval overlapping the write cycle interval and a second write activation interval overlapping the hold cycle interval, and wherein a data signal is delivered to the pixel in the first write activation interval, and an anode of the display element is initialized in the second write activation interval.

20. The display device of claim 19, wherein the transmission control signal includes a transmission activation interval, and wherein the transmission activation interval overlaps the first write activation interval and does not overlap the hold cycle interval.

21. A display device comprising:

a pixel electrically connected to a data line, a write scan line, an initialization scan line, a compensation scan line, a transmission control line, and an emission control line and including a pixel circuit and a display element, wherein the pixel circuit includes a plurality of transistors and a capacitor; and a driving circuit configured to provide a write scan signal, an initialization scan signal, a compensation scan signal, a transmission control signal, and an emission control signal to the write scan line, the initialization scan line, the compensation scan line, the transmission control line, and the emission control line, respectively, wherein the pixel circuit is configured to operate in a write cycle interval and a hold cycle interval, wherein the write scan signal includes a first write activation interval overlapping the write cycle interval and a second write activation interval overlapping the hold cycle interval, wherein, in the first write activation interval, a data signal provided through the data line is delivered to the capacitor, and an anode of the display element is primarily initialized, and wherein, in the second write activation interval, the data signal is blocked from being delivered to the capacitor, and the anode of the display element is secondarily initialized.

22. A driver comprising:

a first driving circuit configured to provide a write scan signal to a write scan line connected to a pixel; and a second driving circuit configured to:

receive a plurality of clock signals, each of which has a time duration of one unit horizontal period; and provide an initialization scan line, a compensation scan line, a transmission control line, and an emission control line, which are connected to the pixel, with an initialization scan signal having an activation interval of two unit horizontal periods or more, a compensation scan signal having an activation interval of two unit horizontal periods or more, a transmission control signal, and an emission control signal, respectively.

23. The driver of claim 22, wherein the initialization scan signal includes a first initialization activation interval having a first horizontal period and a second initialization activation interval having a second horizontal period greater than or equal to the first horizontal period, and wherein the compensation scan signal includes a first compensation activation interval having a third horizontal period and a second compensation activation interval having a fourth horizontal period greater than or equal to the third horizontal period.

24. The driver of claim 22, wherein the write scan signal includes a first write activation interval overlapping a write cycle interval and a second write activation interval overlapping a hold cycle interval, wherein the transmission control signal includes a transmission activation interval, and wherein the transmission activation interval overlaps the first write activation interval and does not overlap the hold cycle interval.

25. The driver of claim 22, wherein the second driving circuit includes:

a first sub-driving circuit configured to receive first clock signals and to output the emission control signal;

a second sub-driving circuit configured to receive second clock signals and to output the initialization scan signal and the compensation scan signal; and a third sub-driving circuit configured to receive third clock signals and to output the transmission control signal, wherein a time duration of each of the first clock signals is one unit horizontal period, wherein a time duration of each of the second clock signals is one unit horizontal period, and wherein a time duration of each of the third clock signals is one unit horizontal period.

26. A pixel comprising:

a display element; and a pixel circuit connected to the display element, wherein the pixel circuit includes:

a first transistor including a gate electrode connected to a first node, a first electrode, and a second electrode connected to a second node;

a first capacitor connected between the first node and a third node;

a second capacitor connected between the third node and a driving voltage line;

a second transistor connected to a data line, wherein an operation of the second transistor is controlled by a write scan signal provided to a write scan line; and a third transistor connected between the second transistor and the third node, an operation of the third transistor being controlled by a transmission control signal provided to a transmission control line and different from the write scan signal.

27. The pixel of claim 26, wherein the pixel circuit further includes:

a fourth transistor connected between the first node and the second node, an operation of the fourth transistor being controlled by a compensation scan signal provided to a compensation scan line;

a fifth transistor connected between the first node and a first initialization voltage line, an operation of the fifth transistor being controlled by an initialization scan signal provided to an initialization scan line;

a sixth transistor connected between the second node and the display element, an operation of the sixth transistor being controlled by an emission control signal provided to an emission control line; and a seventh transistor connected between the display element and a second initialization voltage line, an operation of the seventh transistor being controlled by the write scan signal provided to the write scan line.

28. The pixel of claim 27, wherein the pixel circuit includes:

an eighth transistor connected between the third node and a reference voltage line, an operation of the eighth transistor being controlled by the compensation scan signal provided to the compensation scan line, wherein each of the first transistor, the second transistor, the sixth transistor, and the seventh transistor is a P-type thin film transistor having a silicon semiconductor layer, and wherein each of the third transistor, the fourth transistor, the fifth transistor, and the eighth transistor is an N-type thin film transistor having an oxide semiconductor layer.

29. The pixel of claim 28, wherein the pixel circuit includes:

a ninth transistor connected between the first electrode of the first transistor and the driving voltage line; and a tenth transistor connected between the first electrode of the first transistor and a bias voltage line, an operation of the tenth transistor being controlled by the write scan signal provided to the write scan line, and wherein each of the ninth transistor and the tenth transistor is the P-type thin film transistor having the silicon semiconductor layer.

30. The pixel of claim 27, wherein the pixel circuit includes:

an eighth transistor connected between the first electrode of the first transistor and the third node, an operation of the eighth transistor being controlled by the compensation scan signal provided to the compensation scan line.

* * * * *